United States Patent
Kim

(10) Patent No.: US 10,917,891 B2
(45) Date of Patent: Feb. 9, 2021

(54) ADAPTIVE MULTI-CHANNEL V2X COMMUNICATION

(71) Applicant: LG Electronics Inc., Seoul (KR)

(72) Inventor: Soyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 16/363,248

(22) Filed: Mar. 25, 2019

(65) Prior Publication Data

US 2019/0373609 A1 Dec. 5, 2019

Related U.S. Application Data

(60) Provisional application No. 62/679,026, filed on Jun. 1, 2018.

(51) Int. Cl.
*H04W 72/04* (2009.01)
*H04W 4/40* (2018.01)
*H04B 17/336* (2015.01)

(52) U.S. Cl.
CPC ...... *H04W 72/0453* (2013.01); *H04B 17/336* (2015.01); *H04W 4/40* (2018.02)

(58) Field of Classification Search
None
See application file for complete search history.

(56) References Cited

U.S. PATENT DOCUMENTS

| | | | |
|---|---|---|---|
| 2012/0093091 A1* | 4/2012 | Kang | H04W 4/90 370/329 |
| 2016/0112856 A1* | 4/2016 | Han | H04L 67/12 455/404.1 |
| 2016/0150451 A1* | 5/2016 | Barreto De Miranda Sargento .... H04W 36/32 370/332 |

(Continued)

FOREIGN PATENT DOCUMENTS

WO WO2017048100 3/2017

OTHER PUBLICATIONS

Extended European Search Report in European Application No. 19174961.3, dated Sep. 11, 2019, 8 pages.

(Continued)

*Primary Examiner* — Saba Tsegaye
(74) *Attorney, Agent, or Firm* — Fish & Richardson P.C.

(57) ABSTRACT

A method of transmitting, by a communication unit, channel allocation information for V2X (Vehicle-to-Everything) wireless communications. The method includes: determining a first channel that is utilized for V2X communications; determining state information including first state information regarding signal interference in the first channel; determining whether the state information satisfies at least one criteria; and based on a determination that the state information satisfies the at least one criteria: determining a second channel through which to transmit channel-reassignment information; determining a third range of frequencies, (Continued)

different from first and second ranges of frequencies for the first and second channels, to which to re-assign the V2X communications of the first channel; and transmitting, through the second channel to at least one vehicle, the channel-reassignment information regarding a change in channel assignment for the V2X communications from the first channel to the third range of frequencies.

20 Claims, 14 Drawing Sheets

(56) References Cited

U.S. PATENT DOCUMENTS

2017/0272971 A1     9/2017   Boban
2018/0338259 A1*  11/2018  Boban .................. H04W 28/08
2019/0159223 A1*   5/2019  Park .................. H04W 72/1252

OTHER PUBLICATIONS

Leinmuller, et al., "Multi-channel Usage in Day 2 and beyond EU V2X Systems," 22nd ITS World Congress, Bordeaux, France, Oct. 5-9, 2015, Paper No. ITS-2500, 10 pages, XP014306719.

* cited by examiner

ADAPTIVE MULTI-CHANNEL V2X COMMUNICATION

CROSS-REFERENCE TO RELATED APPLICATIONS

This application claims the benefit of an earlier filing date and right of priority to U.S. Provisional Application No. 62/679,026, filed on Jun. 1, 2018, the disclosure of which is considered part of and incorporated by reference herein in the disclosure of this application.

TECHNICAL FIELD

The present disclosure relates to wireless communications, and in particular to vehicular wireless communications.

BACKGROUND

Vehicle-to-everything (V2X) communication provides wireless exchange of information between vehicles and external devices in a vehicular environment, such as other vehicles, network infrastructure devices, and pedestrians. V2X communication systems are typically designed to improve road safety, enhance the efficient flow of road traffic, and provide various types of information services to vehicles and other entities in a vehicular environment.

SUMMARY

In general, the subject matter described in this disclosure can be embodied in methods, apparatuses, and systems for vehicular communication.

According to one aspect of the subject matter described in this application, a method is disclosed for transmitting, by a communication unit, channel allocation information for V2X (Vehicle-to-Everything) communications in a wireless communication. The method includes: determining a first channel, among a plurality of channels, that is utilized for V2X communications, the first channel defined by a first range of frequencies; determining state information that includes first state information regarding signal interference in the first channel; determining whether the state information satisfies at least one criteria; and based on a determination that the state information satisfies the at least one criteria: determining a second channel, among the plurality of channels, through which to transmit channel-reassignment information, the second channel defined by a second range of frequencies; determining a third range of frequencies, different from the first and second ranges of frequencies, to which to re-assign the V2X communications of the first channel; and transmitting, by the communication unit through the second channel to at least one vehicle, the channel-reassignment information regarding a change in channel assignment for the V2X communications from the first channel to the third range of frequencies.

Other implementations of this aspect include corresponding computer systems, apparatus, and computer programs recorded on one or more computer storage devices, each configured to cause at least one operably connected processor to perform the actions of the methods.

Implementations may include one or more of the following features. For example, determining the third range of frequencies, different from the first and second ranges of frequencies, to which to re-assign the V2X communications of the first channel may include: determining a third channel, among the plurality of channels, that defines the third range of frequencies to which to re-assign the V2X communications of the first channel, where the third range of frequencies is disjoint from the first range of frequencies of the first channel.

In some implementations, determining the third range of frequencies, different from the first and second ranges of frequencies, to which to re-assign the V2X communications of the first channel may include: segmenting the first channel into at least two channel segments; and determining a first channel segment, among the at least two channel segments, that defines the third range of frequencies to which to re-assign the V2X communications of the first channel, where the third range of frequencies is a subset of the first range of frequencies of the first channel.

In some implementations, determining the third range of frequencies, different from the first and second ranges of frequencies, to which to re-assign the V2X communications of the first channel may include: determining the third range of frequencies as a result of merging the first range of frequencies and a fourth range of frequencies.

In some examples, determining the third range of frequencies, different from the first and second ranges of frequencies, to which to re-assign the V2X communications of the first channel may include: monitoring, among the plurality of channels, a plurality of candidate channels and their respective signal-to-interference conditions; and determining, based on monitoring the plurality of candidate channels and their respective signal-to-interference conditions, a third channel having a signal-to-interference that is minimal among the plurality of candidate channels.

In some implementations, determining the state information that may include the first state information regarding signal interference in the first channel may include: measuring a first ratio of time that the first channel is busy, as perceived by the communication unit; and determining a second ratio of time that the first channel is busy, as perceived by at least one vehicle other than the communication unit. In some examples, measuring the first ratio of time that the first channel is busy, as perceived by the communication unit, may include: measuring, at a transceiver of the communication unit, signal-to-interference in the first channel; and determining a first duration of time during which the signal-to-interference in the first channel measured at the transceiver of the communication unit exceeds a threshold.

In some examples, determining the second ratio of time that the first channel is busy, as perceived by the at least one vehicle other than the communication unit, may include: receiving, by the communication unit, information regarding a second duration of time during which signal-to-interference in the first channel measured by the at least one vehicle other than the communication unit exceeds a threshold. In some examples, determining the second ratio of time that the first channel is busy, as perceived by the at least one vehicle other than the communication unit, may include: receiving, by the communication unit, information regarding the second ratio of time that the first channel is busy, as perceived by a first vehicle that is 1-hop away from the communication unit, or as perceived by a second vehicle that is 2-hops away from the communication unit.

In some implementations, the state information may further include second state information regarding congestion around the communication unit, the second state information related to a number of sources of interference in the first channel. In some examples, the second state information regarding congestion around the communication unit may include at least one of: (i) a number of messages that have been transmitted or received in the first channel by the communication unit or by at least one vehicle other than the communication unit, (ii) a number of neighboring vehicles around the communication unit, or (iii) sensing information that has been detected by the at least one vehicle other than the communication unit.

In some examples, determining that the state information satisfies the at least one criteria may include: determining, for the first state information, that the signal interference in the first channel exceeds a threshold interference criteria; and determining, for the second state information, that the congestion around the communication unit does not exceed a threshold congestion criteria.

In some implementations, transmitting the channel-reassignment information by the communication unit through the second channel to the at least one vehicle may include: transmitting the channel-reassignment information, through the second channel, using an IEEE 802.11p-based communication protocol. In some examples, the communication unit may be configured to implement a Wireless Access in Vehicular Environments (WAVE) protocol, and the channel reassignment information may be configured as a WAVE Service Announcement (WSA) message. In some examples, the channel reassignment information may include channel bandwidth information and interference information.

In some implementations, the second channel may include a Control Channel (CCH) that has been assigned for the V2X communications. In some examples, the second channel may be channel number 178 that has been assigned for the V2X communications. In some implementations, the plurality of channels may consist of seven channels, each having a bandwidth of 10 MHz, in a 5.9 GHz band of 5.855 GHz to 5.925 GHz.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
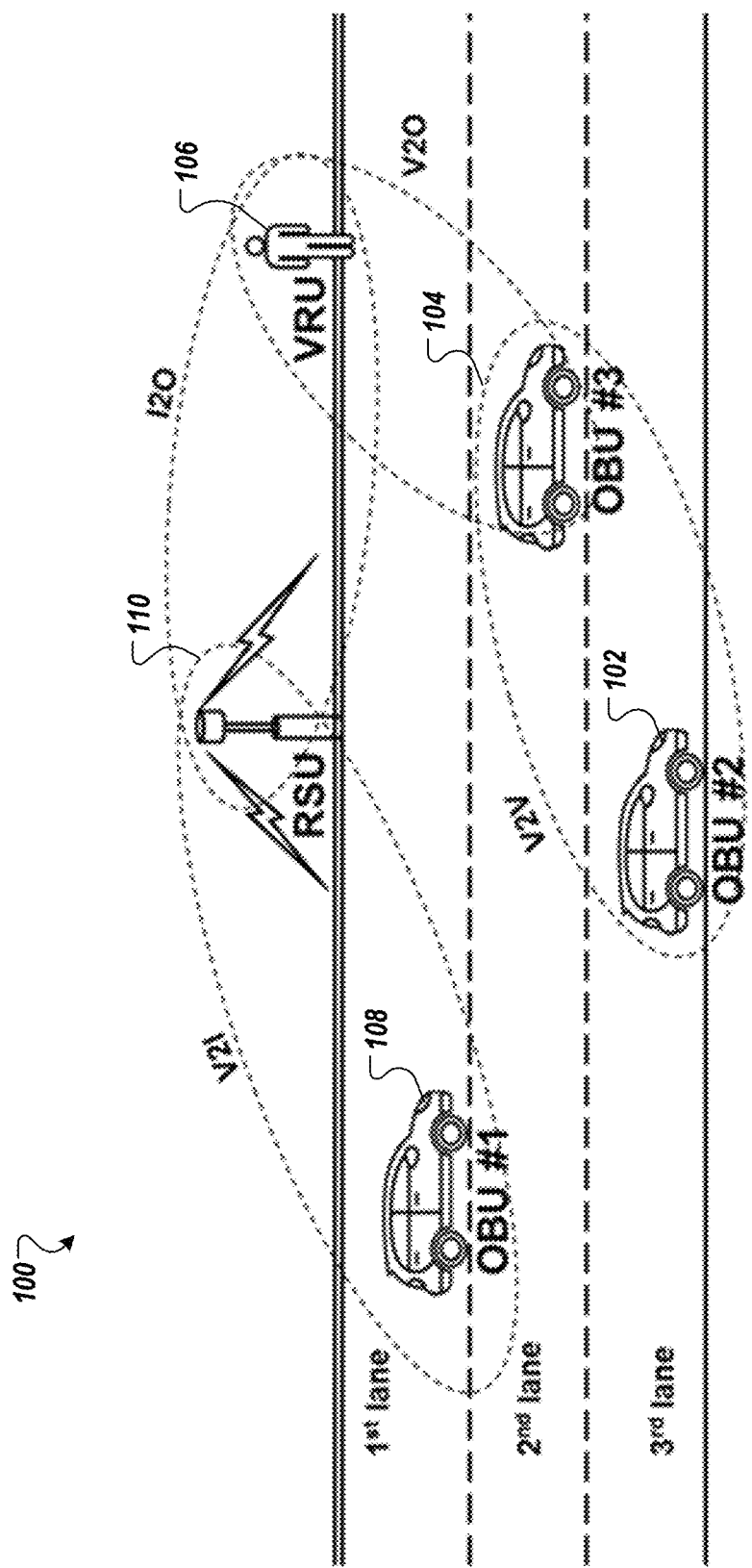
FIG. 1 illustrates an example of a V2X communication system.

Systems and techniques are disclosed herein that enable adaptive multi-channel operation (AMCO) in a wireless V2X vehicular communication system. The AMCO techniques provide improved resistance against interference and improve reliability in V2X communications by enabling dynamic and adaptive channel switching. In some implementations, channel switching information may be transmitted on a separate channel, indicating that V2X communications is to be switched from one channel to another lower-interference channel. The channel switching may be determined based on both signal interference and congestion information around a vehicle.

In some scenarios, V2X communications is configured to utilize a range of frequencies that is divided into multiple channels. Certain channels may be reserved exclusively for critical safety communications or public safety uses, while other channels may be used for non-safety V2X communications. In particular, critical safety communications are typically required to meet stringent reliability and latency requirements for the functioning of crucial vehicular applications, such as advanced driver assistance systems (ADAS).

However, with an increasing number and variety of devices that utilize V2X communications, efficient multi-channel operation is paramount to effectively utilizing the available spectrum resources and ensuring reliable and fast communication performance.

To achieve efficient channel utilization, in some scenarios, a V2X system may implement decentralized congestion control (DCC) to help ensure that a channel is not congested by an excess number of transmissions. In some implementations, the DCC mechanism enables a V2X communication unit, such as an on-board unit (OBU) in a vehicle or a road side unit (RSU) installed in an infrastructure, to adapt its transmission behavior dynamically based on congestion in a channel. For example, a V2X communication unit may monitor a congestion level of a channel and may take actions to mitigate high congestion levels, such as reducing output power (to reduce interference for other vehicles), increasing inter-packet transmission time (to allow other vehicles more opportunity to transmit), drop packets, and/or increase transmission rate (to shorten the transmission duration and allowing other vehicles more time to transmit).

To determine congestion in a channel, in some scenarios, a communication unit may monitor a level of signal-to-interference in the channel. Information regarding the level of signal-to-interference in a channel may be determined by the communication unit itself through local interference measurements, or may be obtained from neighboring vehicles. By monitoring the signal-to-interference in a channel, V2X communication units may adapt their transmission behavior to help reduce channel congestion. Such DCC mechanisms rely on the cooperative behavior of communication units to help reduce overall congestion in the channel.

However, such DCC mechanisms that rely on signal-to-interference information alone may be less effective in scenarios where interference is caused by sources other than DCC-based communication units, such as interference caused by devices using non-DCC protocols or interference caused by environmental sources. In such scenarios, communication units that adapt their transmission behavior according to such DCC mechanisms may be forced to throttle their transmissions and/or suffer increased errors, while the non-DCC source(s) of interference continue to cause interference unimpeded. As a result, DCC-based communication units that adapt their transmission behavior simply based on channel interference alone may suffer from extended periods of low-rate and/or high-latency communication.

As an example of such scenarios, a non-DCC device, such as a drone (or other unmanned aerial vehicle), may be present in a vehicular environment, and may continuously transmit video with high transmission power. Consequently, nearby V2X devices that implement DCC mechanisms may sense a high level of interference in their respective channels, and throttle their transmissions (e.g., by reducing output power and/or increasing inter-packet delays) or accept a higher error rate (e.g., by increasing the transmission rate) accordingly. Meanwhile, the non-DCC drone would continue to transmit at a high transmission power, and thus force the nearby DCC-based V2X vehicles to wait for extended periods of time, potentially causing delays and/or errors in transmission of safety-critical information.

Implementations disclosed herein mitigate such challenges by enabling DCC-based communication units to recognize whether a high level of interference is actually caused by high levels of traffic congestion on the road, or whether the interference is due to non-congestion reasons (e.g., a single source of interference). As such, according to implementations disclosed herein, rather than unnecessarily throttling their transmissions or suffering increased errors for extended periods of time, DCC-based communication units are enabled to proactively switch channels and re-assign their communications to a less-congested channel when appropriate.

In addition, implementations disclosed herein enable a more flexible and dynamic DCC-based multi-channel operation (MCO) that is not necessarily limited to utilize fixed channel assignments, e.g., for critical safety communication. For example, rather than limiting critical safety communication to a fixed control channel, implementations disclosed herein enable more adaptive transmission of such safety information over different channels. As such, by using a more aggressive and efficient distributed control channel, important service announcements may be distributed over different channels, and thus help reduce congestion and delay. As such, implementations disclosed herein may provide a communication environment that is more resistant to attacks by malicious users, as well as more resistant to interference caused by various types of sources.

In particular, implementations disclosed herein may utilize one or more of the following features.

1) Adaptive control channel. In some implementations, when channel load increases or when channel load is not available, communication units may search for a relatively free channel to which to switch communications.

2) Dynamic channel number and/or bandwidth. Certain channels may be configured to carry critical safety information. The inability to use such channels may render ineffective various important vehicular safety services. According to some implementations, if a critical control channel becomes unavailable, then an alternative is adaptively utilized. In addition, for channels that carry both critical and non-critical information, implementations disclosed herein consider the type of content and priority of services on those channels, and allocate channel bandwidth adaptively, e.g., by splitting, moving, or merging channel bandwidth accordingly.

3) Additional congestion-based state information. Rather than relying solely on signal interference for congestion control and adaptive transmission, according to implementations disclosed herein, a communication unit may utilize other types of information that measure congestion, such as a number of messages transmitted on a channel, a number of nearly vehicles, and/or sensor information received from other vehicles.

4) Expanded message set. Some DCC-based systems may implement a set of messages that notify devices about particular channels that should be utilized to exchange particular types of information. According to implementations disclosed herein, the message set is expanded or a new type of message is implemented, to enable more adaptive channel assignment and switching.

As V2X devices and applications become more diversified, vehicular communication systems face an increased risk of abnormal transmission behavior or abnormal interference. Such risks may render difficult or impossible the reliable and timely delivery of important vehicular safety information. Implementations disclosed herein enable a more flexible adaptive multi-channel operation (AMCO) that mitigates such risks. In some scenarios, implementations of AMCO disclosed herein provide improved interference-resistant V2X communications and more flexible and dynamic V2X communication techniques that are not limited to utilizing a fixed channel(s) for communicating traffic safety information. As such, V2X communication environments may be improved by being more resistant to attacks by malicious users, as well as being more resistant to interference caused by various types of messages. Such implementations may provide lower latency, higher throughput, and/or fewer errors in a V2X communication system.

FIG. 1 illustrates an example of a V2X communication system 100. V2X communications is defined by the 3rd Generation Partnership Project (3GPP) as consisting of four types of communication: Vehicle-to-vehicle (V2V), Vehicle-to-infrastructure (V2I), Vehicle-to-network (V2N), and Vehicle-to-pedestrian (V2P). V2V and V2P communication are typically based on broadcast transmissions between vehicles or between vehicles and vulnerable road users (VRUs, e.g., pedestrians and cyclists). V2I communication is typically performed between a vehicle and a road side unit (RSU) installed as part of an infrastructure, which may be used as a traffic control device or as a forwarding node (e.g., repeater) that extends the range of V2X communications. V2N communication is typically performed between a vehicle and a V2X application server, such as a server in a 4G/5G network, for traffic operations. In addition, V2O refers to communication between a vehicle with a V2X transceiver and a VRU with a V2X transceiver. I2O refers to communication between an infrastructure with a V2X transceiver and a VRU with a V2X transceiver. V2X systems may also be referred to as Cooperative Connected Vehicles or cooperative Intelligent Transport Systems (ITS).

A V2X-enabled vehicle may be equipped with an On-Board Unit (OBU), and the OBU may implement Dedicated Short-Range Communications (DSRC) communication modem. DSRC is a family of standards designed to support V2X communications, and may also be referred to as WAVE and are defined in the standards IEEE 1609 and 802.11p. However, implementations disclosed herein are not limited to DSRC/WAVE, and may utilize other mobile communications protocols such as GSM, LTE, LTE-A, and 5G. Furthermore, although the 802.11p protocol is designed to use a default channel bandwidth of 10 MHz, other channel bandwidths may be implemented, such as 5 MHz and 20 MHz.

Figure 2:
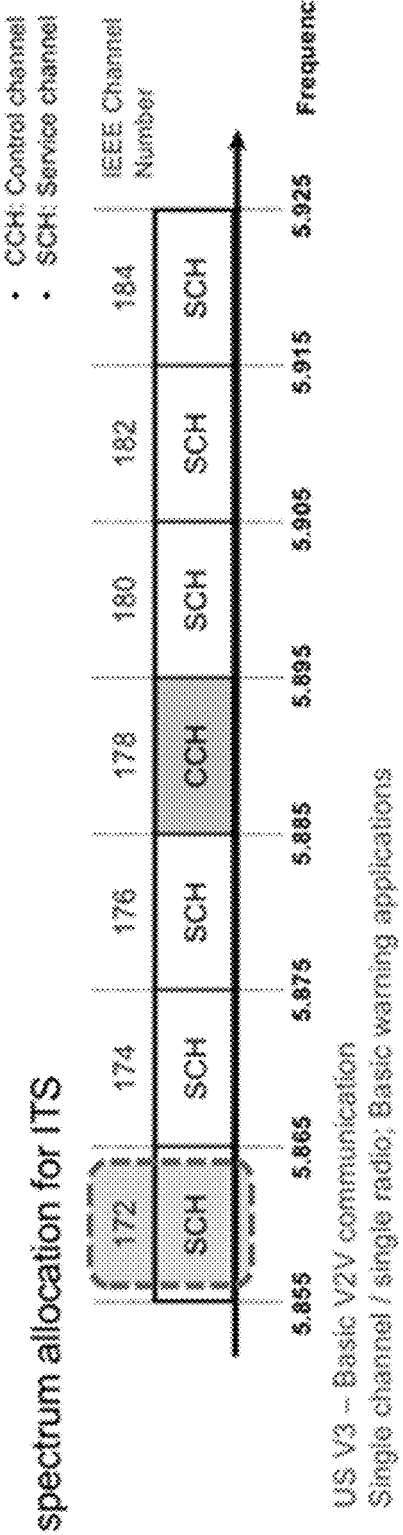
FIG. 2 illustrates examples of a multi-channel arrangement in a V2X communication system.
Figure 2:
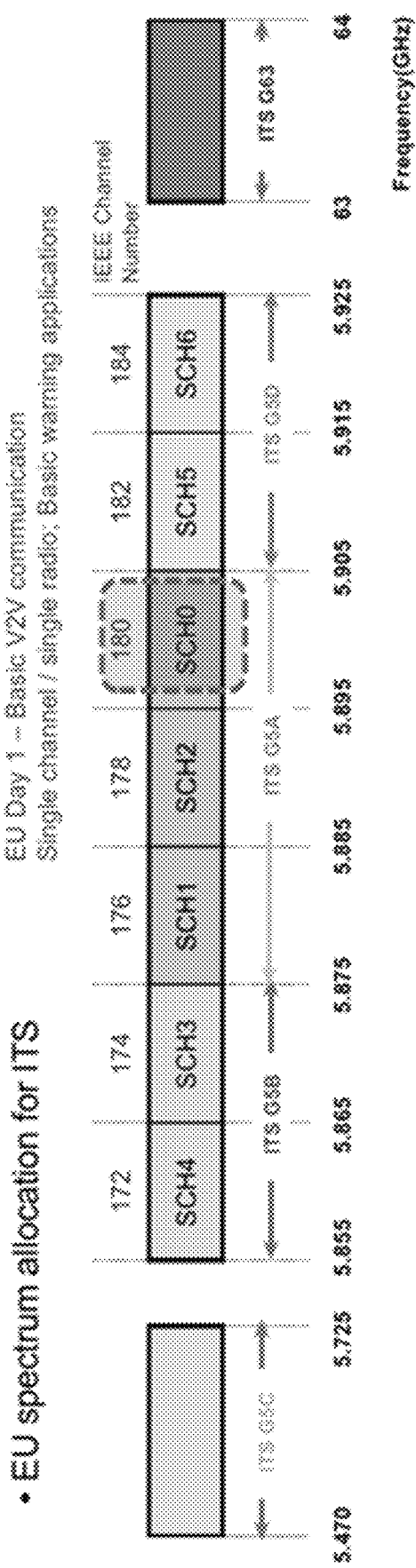

FIG. 2 illustrates examples of a multi-channel arrangement in a V2X communication system. In particular, FIG. 2 illustrates examples of multi-channel operation and frequency allocation and usage in North America and in Europe. As shown in these examples, a V2X communication system may allocate seven different frequency channels in the 5.9 GHz band (5.855 to 5.925 GHz). Each frequency channel may have a bandwidth of 10 MHz, although implementations are not limited thereto. Furthermore, in some implementations (e.g., in Europe), additional frequency bands may be allocated, e.g., to communicate time-sensitive data, such as an ITS-G63 band at an upper frequency range and an ITS-G5C band at a lower frequency range.

Among these different channels, one channel may be reserved as a control channel (CCH) and six channels may be utilized as service channels (SCH). For example, the CCH may be allocated to channel number 178 (e.g., in the U.S.) or channel number 180 (e.g., in Europe), and may be utilized as a default channel for common safety communications. SCH channels may be available for both safety and non-safety communications. In some implementations, messages (e.g., service announcement messages) may be broadcast over the CCH to provide information regarding which services are currently available on which SCH, so that communication units can tune to a desired SCH.

In some implementations, pairs of channels may be merged to form a single 20 MHz channel, for example, channels 174 and 176 may be merged to form channel 175, and channels 180 and 182 may be merged to form channel 181. In some implementations, certain channels (e.g., channel 172) may be reserved exclusively for critical safety-of-life communications, and other channels (e.g., channel 184) may be reserved for high-power public safety uses. The remaining channels may be used for non-safety-related applications.

Various types of messages may be transmitted through these channels. For example, in some implementations, a set of vehicle safety messages may be provided as WAVE short messages (WSMs) provided by the WAVE Short Message Protocol (WSMP), as defined in the IEEE 1609.3 standard. An example of such a WSM is a Basic Safety Message (BSM), which carry various types of vehicle state information (e.g., location, speed, acceleration, and heading) and are utilized by vehicular systems (e.g., ADAS) for crash avoidance and other safety applications.

Figure 3:
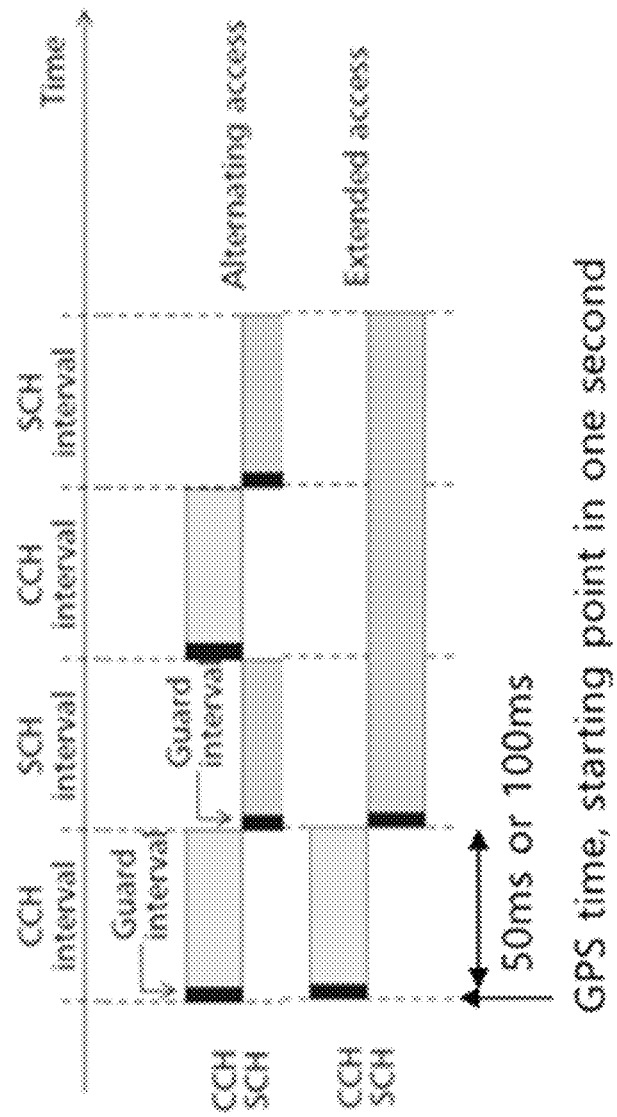
FIG. 3 illustrates examples of multi-channel operation in a V2X communication system.

FIG. 3 illustrates examples of multi-channel operation in a V2X communication system. As shown in this example, a V2X communication system may implement a series of channel intervals that segment time into alternating Control Channel (CCH) intervals and Service Channel (SCH) intervals. Consecutive intervals may be used to transmit through different channels in an alternating manner (alternating access), or may be used to transmit through a single channel in a continuous manner (extended access).

As an example, a communication unit (e.g., a DSRC onboard unit in a vehicle) may be configured to, by default, be tuned to a particular channel (e.g., CCH) to send and receive safety messages. If the communication unit then utilizes another channel (e.g., a SCH) to engage in non-safety communications, then the communication unit may alternate between the CCH and SCH channels. Through such alternating channel access, the communication unit may monitor for safety communications during CCH intervals, and communicate non-safety information for other applications during SCH intervals.

In some implementations, a guard interval may be inserted between adjacent signal blocks, for example to mitigate effects of delay spread in the wireless communications. In some implementations, the guard interval may include a specific sequence to facilitate synchronization or channel estimation at the receiver. For example, in an OFDM system, a cyclic prefix may be inserted into a guard interval of an OFDM symbol. Such guard intervals, however, may be omitted or may be replaced by other structures or techniques having similar or equivalent functionality.

Although the example of FIG. 3 illustrates a scenario of alternating between different channels at fixed interval boundaries, which may be referred to as fully synchronous operation, implementations are not limited thereto. Such fully synchronous channel access may be implemented based on an absolute time (e.g., a global positioning satellite, or GPS, time). However, some implementations may implement channel access in a partially synchronous or asynchronous manner, regardless of interval boundaries, for example according to the contents of the messages being transmitted.

To achieve efficient channel utilization, a V2X communication unit may implement decentralized congestion control (DCC) to adapt its transmission behavior dynamically based on congestion in a channel. For example, a V2X communication unit may monitor a congestion level of a channel and reduce output power, increase inter-packet transmission time, drop packets, and/or reduce transmission rate to mitigate high congestion levels.

However, as discussed above, in some scenarios, a problem may arise in that interference caused by non-DCC sources (e.g., interference caused by a device using other protocols, or interference caused by environmental factors) may cause nearby DCC-based communication units to throttle transmission or suffer increased errors for an extended period of time. Such problems may result in delays and errors in transmitting critical safety information for the V2X communication system.

According to implementations disclosed herein, a communication unit may switch V2X communications to another channel in a dynamic and adaptive manner based on detected levels of congestion. For example, a communication unit may transmit, to other communication units, a message that includes channel-reassignment information that informs the other communication units to switch to another channel. Such channel-reassignment information may be transmitted on a channel other than the channel originally used for transmitting the V2X communications, thus helping to ensure improved reliability and less delay in switching channels.

Furthermore, according to some implementations, the decision as to whether to switch channels may be made based on additional state information that supplements state information regarding signal interference alone. For example, such additional state information may include information regarding a number of vehicles in a vicinity of the communication unit (e.g., within a certain number of hops of communication, or within a certain geographic distance), or regarding a number of messages that are detected on the channel, or regarding sensing information that is received from other vehicles (e.g., information sensed by ADAS sensors of other vehicles, including nearby objects), or other types of information that generally relates to a level of congestion (e.g., a number of interference sources) for the channel.

Such adaptive channel switching is referred to herein as Adaptive Multi-Channel Operation (AMCO) and is described in further detail below.

Figure 4A:
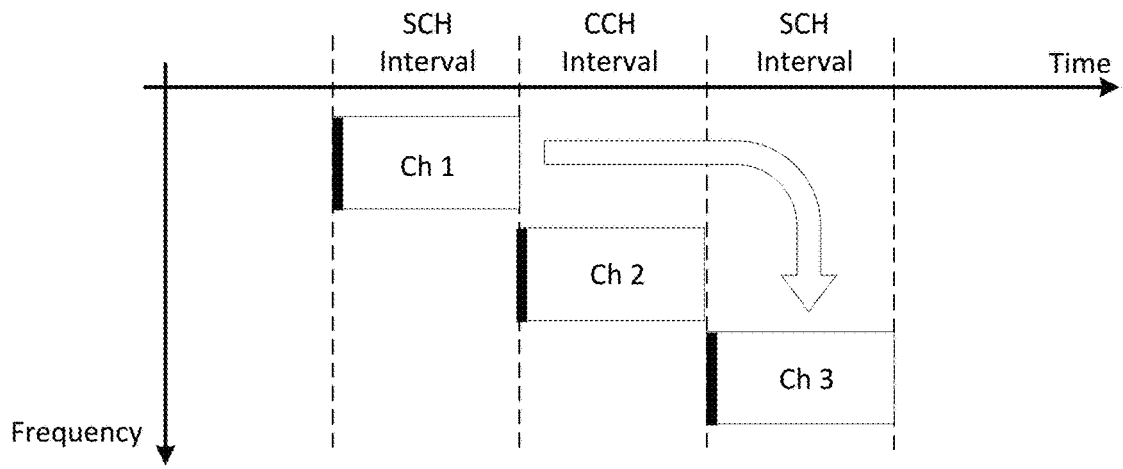
FIGS. 4A to 4C illustrate examples of adaptive multi-channel operation (AMCO), according to some implementations disclosed herein.
Figure 4B:
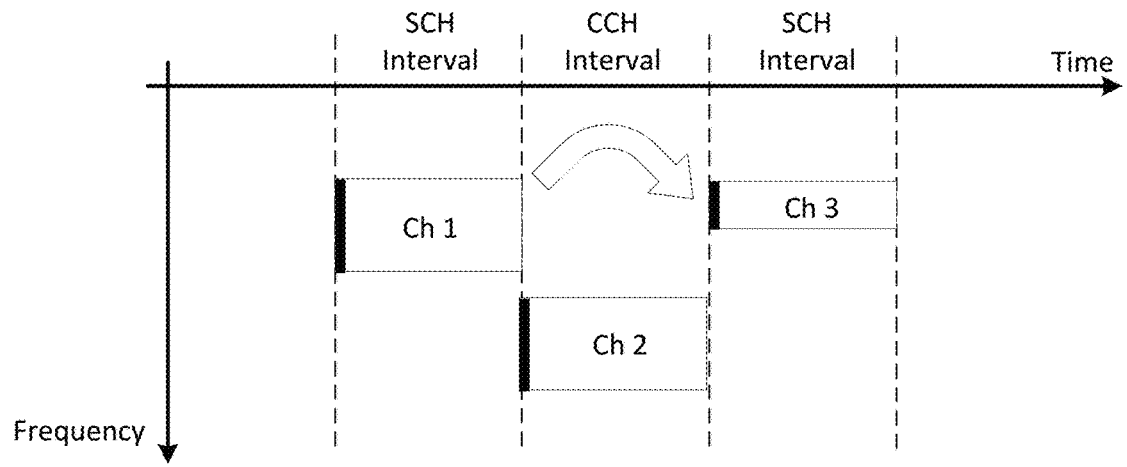
Figure 4C:
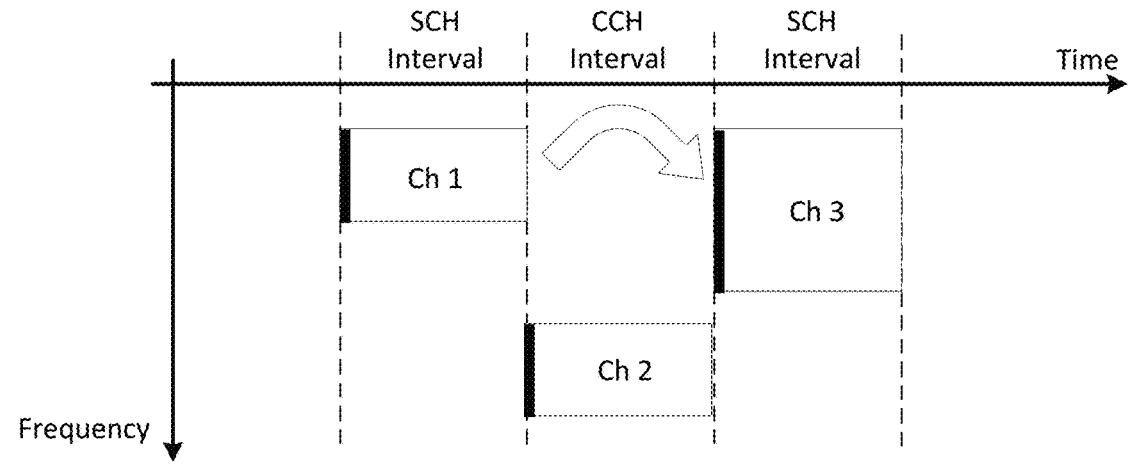

FIGS. 4A, 4B, and 4C illustrate examples of adaptive multi-channel operation (AMCO), according to some implementations disclosed herein. In particular, FIGS. 4A to 4C illustrate various examples of switching between channels in an AMCO system. In general, there may be various ways to allocate, move, and manage V2X communications between different channels or frequency bands. In the examples below, a communication unit switches from a first channel to a third channel (or a third range of frequencies) based on channel re-assignment information that is transmitted over a second channel.

FIG. 4A illustrates an example of switching from a first channel to a third channel that is disjoint from the first channel. In this example, the communication unit selects the third channel from among multiple candidate channels (e.g., from among the seven 10 MHz channels provided in a DSRC system). The communication unit may select the third channel based on a level of interference and congestion measured for the third channel. The communication unit then shifts the channel load from the first channel to the smaller-load third channel, and informs the channel re-assignment to other vehicles.

FIG. 4B illustrates an example of segmenting the first channel into multiple channel segments, and switching from the first channel to a third channel (or, in general, a third range of frequencies) that is one of the channel segments within the first channel. For example, the first channel may be a 10 MHz channel that is segmented into two 5 MHz channel segments (e.g., an upper frequency segment, and a lower frequency segment). The communication unit may then select one of the channel segments that has acceptable interference and congestion levels, and switch channel assignment from the first channel to the selected channel segment. In general, any number of channel segments may be generated that may each have the same or different bandwidths.

FIG. 4C illustrates an example of merging the first channel with another range of frequencies, and switching from the first channel to a third channel (or a third range of frequencies) that is a result of merged frequencies. In this example, the communication unit may merge the first channel with an adjacent range of frequencies, resulting in a third channel (or, in general, a third range of frequencies). As a result, transmission power may be distributed over the larger range of frequencies in the third channel, providing improved resistance to interference that may occur at particular frequencies. In some implementations, priority may be given to critical safety communication by assigning such applications to the newly merged adjacent frequencies, while keeping less-critical communications in the original first channel. In such implementations, the benefits of AMCO may be further enhanced by prioritizing critical safety applications over lower-priority applications (e.g., non-safety applications, or multi-hop applications).

In each of the examples in FIGS. 4A to 4C, above, channel-reassignment information may be transmitted over a second channel that is different from the first channel and the third channel (or the third range of frequencies). As such, transmission of the channel reassignment information may be made more resistant to interference and delays, as compared to transmitting the channel reassignment information through the first channel itself (which may have had high signal interference to begin with). Thus, dynamic and adaptive channel allocation may be achieved in a fast and reliable manner.

By appropriately utilizing the channel movement/segmenting/merging techniques described in FIGS. 4A to 4C, implementations disclosed herein enable AMCO that adapts flexibly to the influence of congestion or interference.

Figure 5:
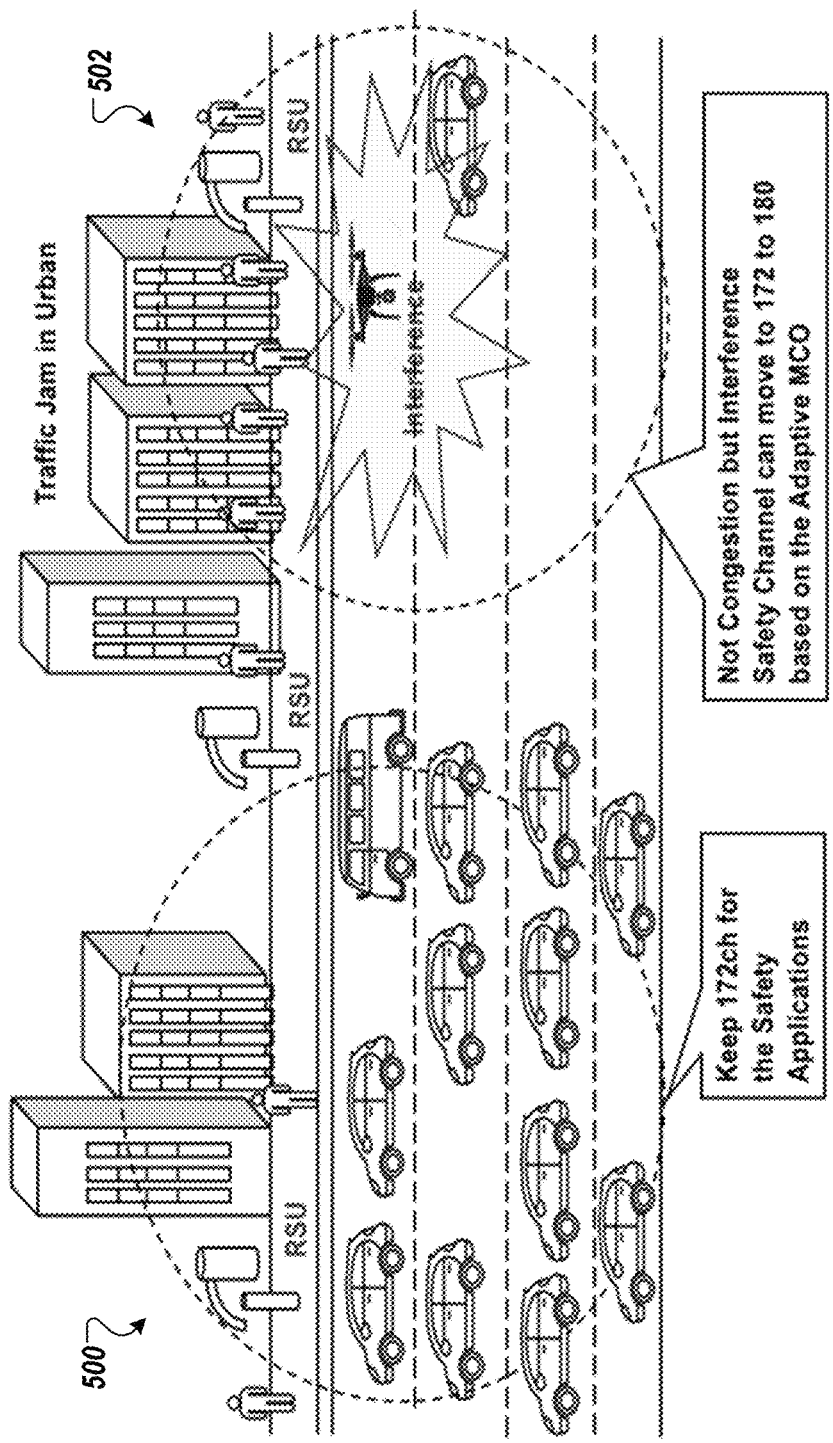
FIG. 5 illustrates an example of a scenario of utilizing AMCO, according to some implementations disclosed herein.

FIG. 5 illustrates an example of a scenario of utilizing AMCO, according to some implementations disclosed herein. This example illustrates two different geographic regions, 500 and 502, that each have high levels of signal interference, but that have different sources of that signal interference.

In region 500, a large number of vehicles communicate over a common channel (e.g., channel 172). By implementing a decentralized congestion control (DCC) mechanism, the vehicles will cooperate to attempt to reduce the overall level of interference in the channel, thus allowing critical safety information to be transmitted quickly and reliably. For example, each of the vehicles may reduce their transmission power (thus reducing interference for other vehicles), or may increase the time between transmitting packets (thus giving other vehicles more opportunities to transmit on lower-interference time intervals), and/or may increase transmission rate (thus reducing the transmission time and allowing other vehicles more time to transmit). Through such cooperative decentralized actions, the vehicles may collectively strive to reduce overall interference in the channel and help prevent delays and errors in critical safety-related communication.

By contrast, in region 502, only one vehicle is communicating over a channel (e.g., channel 172), but is nonetheless experiencing high levels of interference caused by a non-DCC device, such as a drone (or other unmanned aerial vehicle). For example, the drone may be continuously transmitting video or other data with high transmission power, disregarding the cooperative congestion control behavior of the DCC protocol. Consequently, a nearby V2X vehicle that implements DCC senses a high level of interference in the channel, and throttles its transmission (e.g., reduces output power and/or increases inter-packet delay) or suffers increased error rate (e.g., increases its transmission rate) according to the DCC protocol. However, because the drone does not follow the DCC protocol and therefore continues to transmit at a high transmission power, the DCC vehicle is forced to suffer delays and errors for an extended period of time, potentially disrupting the transmission of safety-critical information.

According to implementations disclosed herein, such difficulties are mitigated by enabling DCC-based communication units to recognize whether a high level of interference is caused by high levels of congestion on the road, or whether the interference is caused by non-congestion reasons (e.g., a single source of interference or environmental factors). As such, rather than unnecessarily throttling transmission or suffering more errors for extended periods of time, DCC-based communication units are enabled to recognize an abnormal situation of non-congested high-interference, and switch channels and re-assign their V2X communications to a less-congested channel.

In this example, the vehicle in region 502 may utilize various types of information, in addition to signal interference information, to recognize a non-congested and high-interference state. Such additional information may include a number of neighboring vehicles, a number of messages (e.g., V2X messages) transmitted on the channel, road traffic information (e.g., as received from a Traffic Management Center (TMR) or navigation system), and/or sensing information received from nearby vehicles (e.g., ADAS sensor information regarding nearby objects). Such information may generally be referred to as congestion-related information, as they relate to a level of congestion (e.g., a number of potential interference sources), and can be distinguished from interference-related information that simply relates to a level of signal interference (which can be caused by just a single interference source). By combining congestion information with interference information to create a more general type of state information, a communication unit may effectively perform adaptive multi-channel operation (AMCO) that adapts to a variety of different situations of interference.

Figure 6:
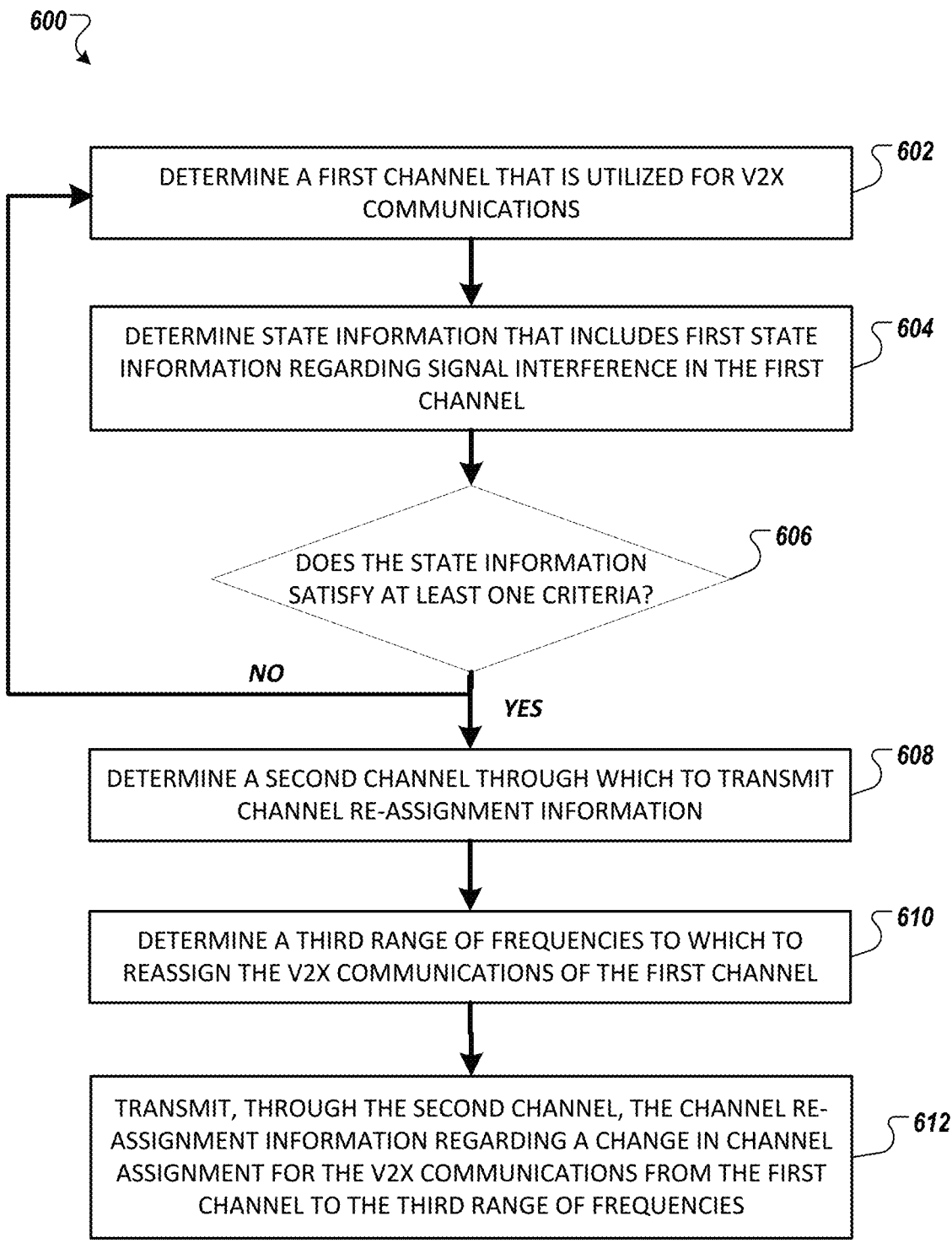
FIG. 6 is a flowchart illustrating an example of operations performed by a transmitter using AMCO according to some implementations disclosed herein.

FIG. 6 is a flowchart illustrating an example method 600 of operations performed by a transmitter using AMCO according to some implementations disclosed herein. The method 600 may be performed by one or more processors, such as one or more CPUs, GPUs, DSPs, FPGAs, ASICs, TPUs, neuromorphic chips, or vector accelerators that execute instructions encoded on at least one computer storage medium.

The method 600 may be used by a communication unit to transmit channel allocation information for V2X (Vehicle-to-Everything) communications in a wireless communication system.

The example transmission method 600 includes determining a first channel, among a plurality of channels, that is utilized for V2X communications, the first channel defined by a first range of frequencies (602). For example, the plurality of channels may consist of seven channels, each having a bandwidth of 10 MHz, in a 5.9 GHz band of 5.855 GHz to 5.925 GHz, as defined in the DSRC protocol.

The method 600 further includes determining state information that includes first state information regarding signal interference in the first channel (604). In some implementations, the state information is determined by measuring a first ratio of time that the first channel is busy, as perceived by the communication unit; and determining a second ratio of time that the first channel is busy, as perceived by at least one vehicle other than the communication unit.

In some implementations, measuring the first ratio of time that the first channel is busy, as perceived by the communication unit, may include measuring, at a transceiver of the communication unit, signal-to-interference in the first channel; and determining a first duration of time during which the signal-to-interference in the first channel measured at the transceiver of the communication unit exceeds a threshold.

In some implementations, measuring the second ratio of time that the first channel is busy, as perceived by the at least one vehicle other than the communication unit, may include receiving, by the communication unit, information regarding a second duration of time during which signal-to-interference in the first channel measured by the at least one vehicle other than the communication unit exceeds a threshold. In some implementations, determining the second ratio of time that the first channel is busy, as perceived by the at least one vehicle other than the communication unit, may include receiving, by the communication unit, information regarding the second ratio of time that the first channel is busy, as perceived by a first vehicle that is 1-hop away from the communication unit, or as perceived by a second vehicle that is 2-hops away from the communication unit.

In some implementations, the state information may further include second state information regarding congestion around the communication unit, the second state information related to a number of sources of interference in the first channel. In such implementations, the second state information may include at least one of (i) a number of messages transmitted or received in the first channel by the communication unit or by at least one vehicle other than the communication unit, (ii) a number of neighboring vehicles around the communication unit, or (iii) sensing information detected by the at least one vehicle other than the communication unit.

The method 600 further includes determining whether the state information satisfies at least one criteria (606). In some implementations where the state information further includes second state information regarding congestion around the communication unit, determining that the state information satisfies the at least one criteria may include: determining, for the first state information, that the signal interference in the first channel exceeds a threshold interference criteria; and determining, for the second state information, that the congestion around the communication unit does not exceed a threshold congestion criteria.

The method 600 further includes, based on a determination that the state information satisfies the at least one criteria, determining a second channel, among the plurality of channels, through which to transmit channel-reassignment information, the second channel defined by a second range of frequencies (608). In some implementations, the second channel may include a Control Channel (CCH) for DSRC, such as channel number 178.

The method 600 further includes determining a third range of frequencies, different from the first and second ranges of frequencies, to which to re-assign the V2X communications of the first channel (610). In some implementations, determining the third range of frequencies may include determining a third channel that defines the third range of frequencies to which to re-assign the V2X communications of the first channel, where the third range of frequencies is disjoint from the first range of frequencies of the first channel. In some implementations, determining the third range of frequencies may include segmenting the first channel into at least two channel segments, and determining a first channel segment, among the at least two channel segments, that defines the third range of frequencies to which to re-assign the V2X communications of the first channel (the third range of frequencies being a subset of the first range of frequencies of the first channel). In some implementations, determining the third range of frequencies may include determining the third range of frequencies as a result of merging the first range of frequencies and a fourth range of frequencies. In some implementations, the third channel is determined by monitoring a plurality of candidate channels and their respective signal-to-interference conditions; and determining the third channel having a signal-to-interference that is minimal among the plurality of candidate channels.

The method 600 further includes transmitting, by the communication unit through the second channel to at least one vehicle, the channel-reassignment information regarding a change in channel assignment for the V2X communications from the first channel to the third range of frequencies (612). In some implementations, the channel-reassignment information may be transmitted through the second channel using an IEEE 802.11p-based communication protocol. In some implementations, the communication unit may be configured to implement a Wireless Access in Vehicular Environments (WAVE) protocol, and the channel re-assignment information may be configured as a WAVE Service Announcement (WSA) message. In some implementations, the channel re-assignment information includes channel bandwidth information and interference information.

Figure 7A:
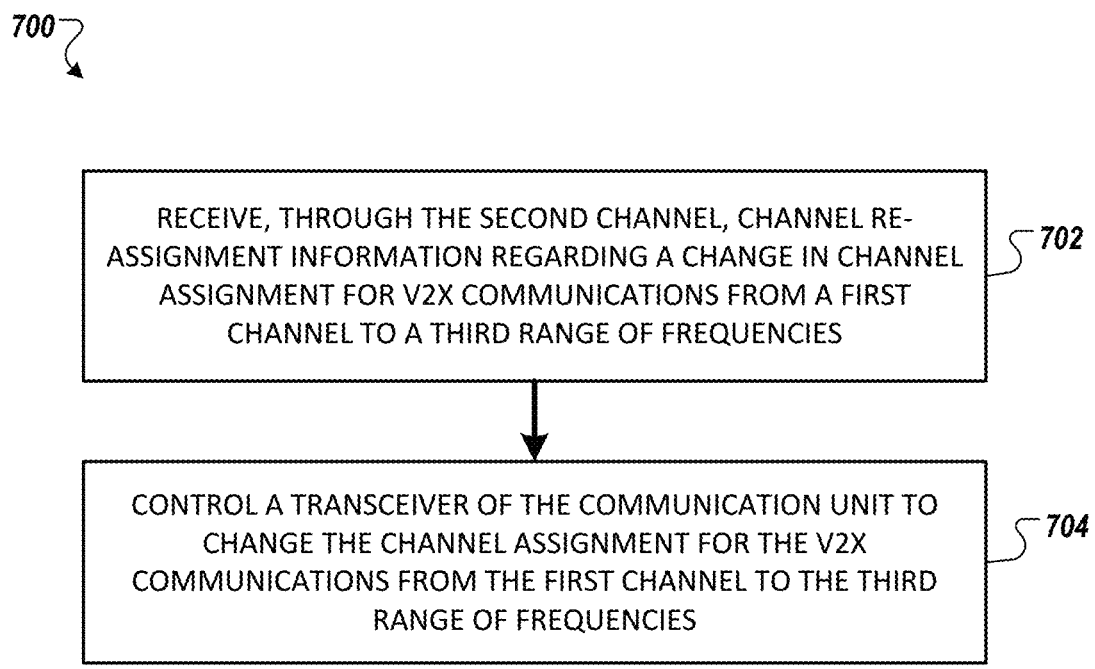
FIGS. 7A and 7B are flowcharts illustrating an example of operations performed by a receiver using AMCO according to some implementations disclosed herein.
Figure 7B:
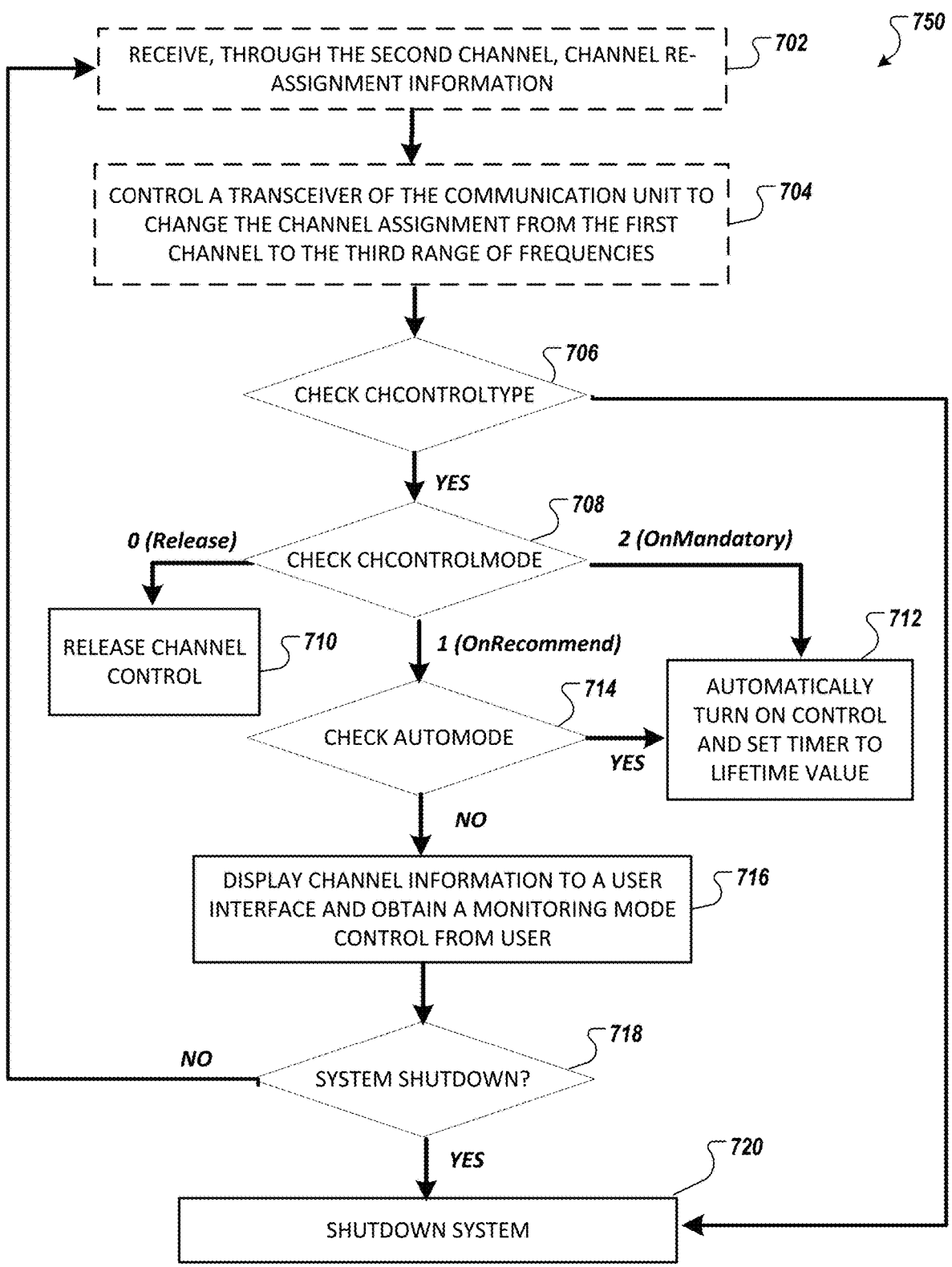

FIGS. 7A and 7B are flowcharts illustrating an example method 700 of operations performed by a receiver using AMCO according to some implementations disclosed herein. The method 700 may be performed by one or more processors, such as one or more CPUs, GPUs, DSPs, FPGAs, ASICs, TPUs, neuromorphic chips, or vector accelerators that execute instructions encoded on a computer storage medium.

The method 700 may be used by a communication unit to receive channel allocation information for V2X (Vehicle-to-Everything) communications in a wireless communication system.

The example reception method 700 includes receiving, by the communication unit through the second channel, channel-reassignment information regarding a change in channel assignment for the V2X communications from a first channel to a third range of frequencies (702). The third range of frequencies may be different from a first range of frequencies of the first channel and a second range of frequencies of the second channel.

The reception method 700 further includes controlling a transceiver of the communication device to change the channel assignment for the V2X communications from the first channel to the third range of frequencies (704).

In some implementations, the channel-reassignment information described in FIGS. 6 and 7A-7B may be implemented by a particular message (e.g., ChControlMessage, described further below) carrying ITS channel control information.

In some implementations, the channel reassignment information described in FIGS. 6 and 7A-7B may further include information regarding monitoring channels for signal interference. Such information may be used, for example, to collect interference information that is used to decide whether to switch channels in the AMCO mechanism.

For example, in some implementations, upon receipt of the channel reassignment information (e.g., a ChControlMessage as described further below), the receiving communication unit may check a particular field (e.g., a ChControlType field). If the ChControlType field is present, then the receiving communication unit may determine whether to implement one or more monitoring modes. For example, if the ChControlType field has a '0' value, then control may be is released so that no channel monitoring is performed. If the ChControlType field has a '1' value, then the receiving communication unit may check whether an "auto mode" is set, and if "auto mode" is not set, then the receiving communication unit (e.g., an OBU of a vehicle) may guide a driver of the vehicle through instructions (e.g., by navigator or voice) to inform the user of channel environments and turn over channel monitoring control to the driver. Otherwise, if the "auto mode" setting is on, then the receiving communication unit may automatically implement a monitoring mode that is pre-specified, and set a timer using a timer value specified in the ChControlMessage. Finally, if the ChControlType field has a '2' value, then the receiving communication unit may mandatorily implement a specified monitoring mode and set a timer to a specified value. Subsequently, the receiving communication unit may wait for the next V2X message.

Through such adaptive monitoring mode control, V2X communication units may implement various types of power-saving techniques to balance channel monitoring with power consumption.

Figure 8:
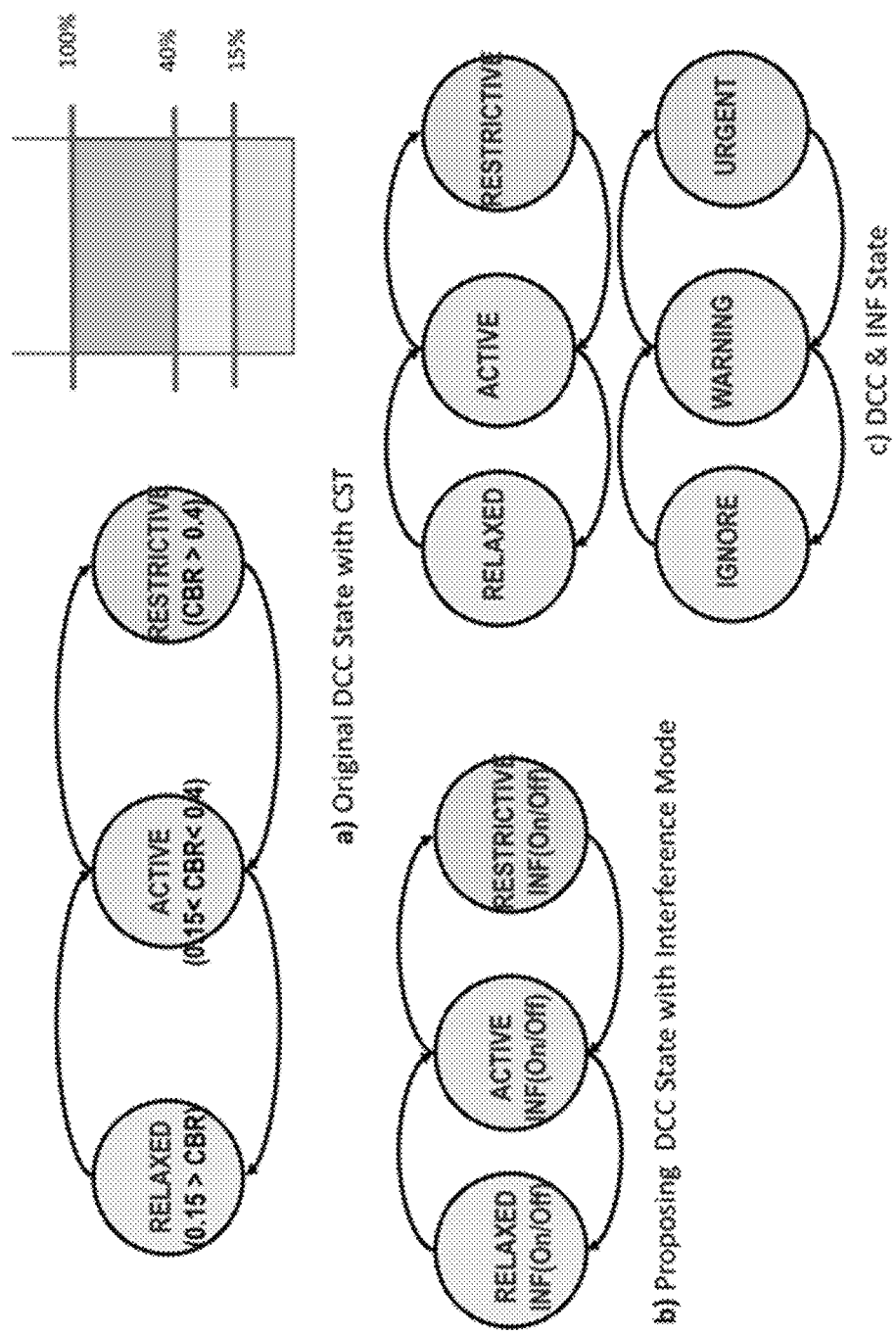
FIG. 8 illustrates an example of AMCO based on a combination of interference and congestion according to some implementations disclosed herein.

FIG. 8 illustrates an example of AMCO based on a combination of interference and congestion according to some implementations disclosed herein. Congestion information may be used to manage a status of DCC as discussed above. In particular, the example of FIG. 8 illustrates an example of utilizing congestion information to manage DCC state and interference modes according to some implementations.

In part (a) of FIG. 8, a DCC state management and CST (Channel Sensing Threshold) are shown, which does not utilize any congestion information. The signal interference of the channel may be characterized by a channel business ratio (CBR), which may be a ratio of time that the signal interference is above a threshold. In this example, the CBR is classified into three states, "RELAXED" (indicating a low level of interference), "ACTIVE" (indicating a higher level of interference), and "RESTRICTIVE" (indicating the highest level of interference). Based on the particular mode in which a channel is in, a communication unit may easily classify and determine the interference level of the channel.

In parts (b) and (c), additional congestion information is utilized to augment each state or augment the state space with additional "Interference Mode" or "Interference State" information. In part (b), a binary value of interference mode (e.g., "ON" or "OFF") is utilized to indicate an abnormal interference situation (e.g., strong interference caused by a few number of sources). Such a determination may be made, for example, based on whether congestion information (as described previously) is below a threshold (indicating low congestion and therefore likely abnormal interference caused by a few number of non-DCC sources) or above a threshold (indicating high congestion and therefore likely normal interference caused by numerous DCC-based vehicles).

In part (c), an interference state is utilized to reflect a more granular level of interference information. For example, three interference states may be implemented, indicating whether to "IGNORE" the interference (e.g., due to normal interference caused by numerous DCC-based vehicles), or to provide a "WARNING" (e.g., due to potential medium levels of interference caused by fewer interference sources), or to indicate an "URGENT" interference situation (e.g., due to high levels of interference caused by a few number of non-DCC sources). As with part (b), the interference state may be determined based on both signal interference in the channel, as well as congestion information reflecting a number of interference sources (as discussed previously).

Figure 9:
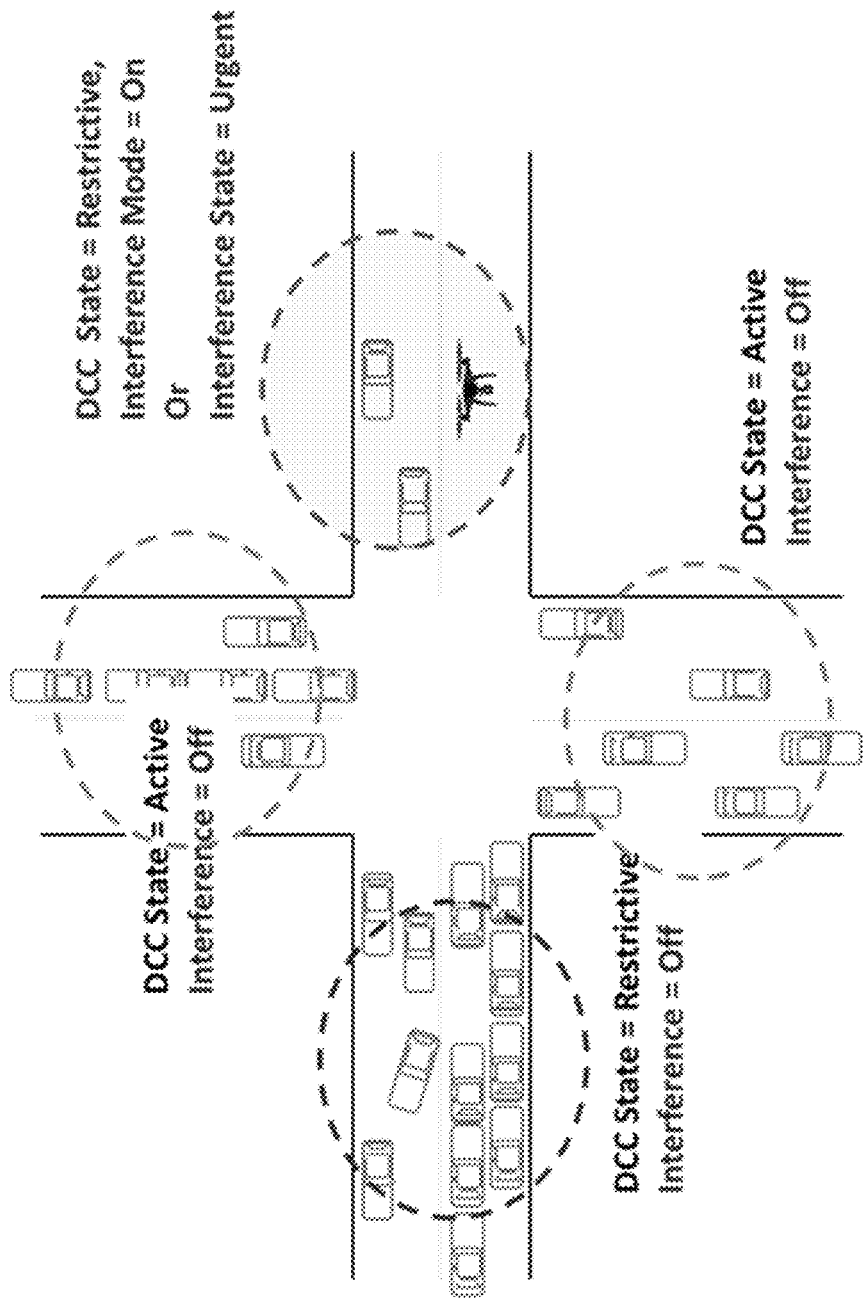
FIG. 9 illustrates an example of a scenario utilizing a combination of interference and congestion, according to some implementations disclosed herein.
Figure 10:
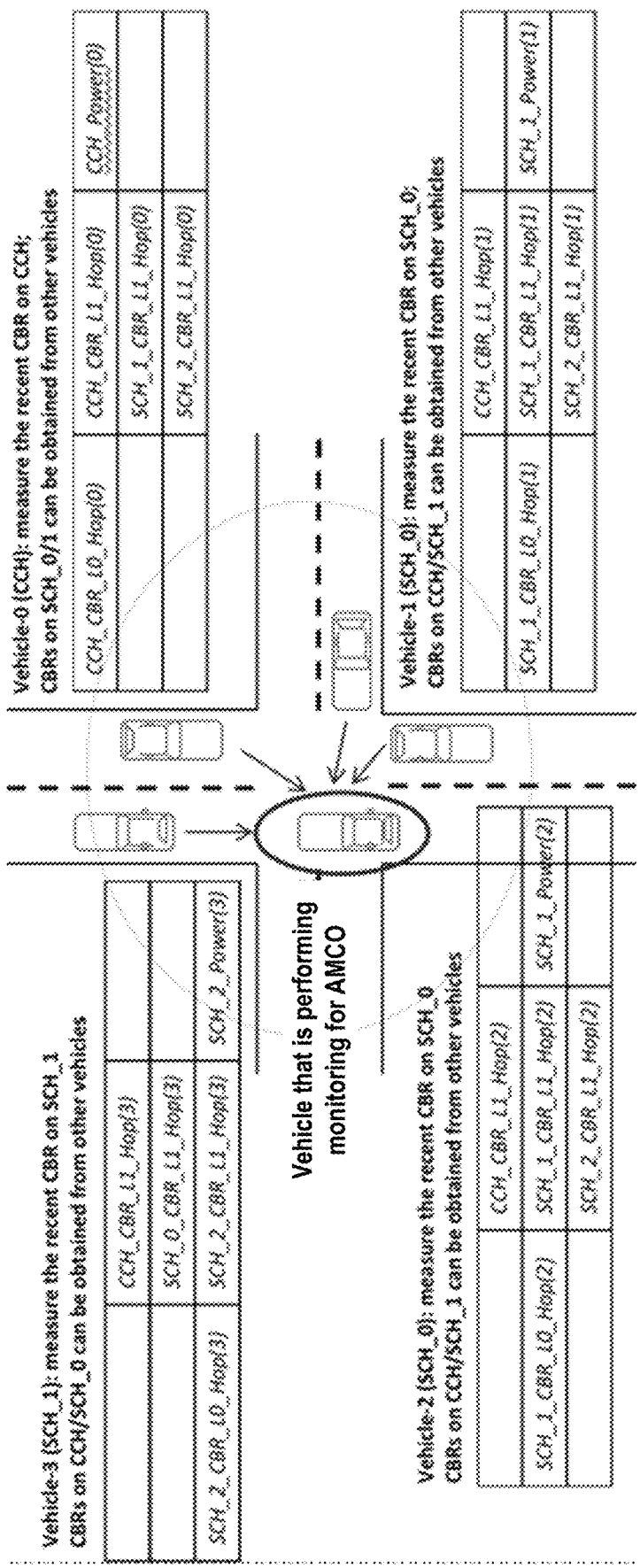
FIG. 10 illustrates an example of collecting interference information from other vehicles, according to some implementations disclosed herein.

FIG. 9 illustrates an example of a scenario utilizing a combination of interference and congestion, according to some implementations disclosed herein. In this example, a communication unit (e.g., an OBU of a vehicle) utilizes a combination of DCC state and interference mode.

The example of FIG. 9 illustrates three scenarios in which a vehicle detects a congestion level that exceeds a threshold, and therefore sets an interference mode to be "OFF" to indicate that interference is likely to be caused by a normal situation in which a large number of DCC-based vehicles are concurrently utilizing a channel. In two of these scenarios, the DCC state is "ACTIVE" to indicate a medium level of signal interference (CBR value), while in one of the scenarios, the DCC state is "RESTRICTIVE" to indicate a level of signal interference (CBR value). As discussed previously, in these three scenarios, the DCC state determines the remedial action that a DCC-based vehicle will implement to cooperatively reduce interference in the channel (e.g., by reducing power, increasing inter-packet delay, or increasing transmission rate).

In addition, the example of FIG. 9 illustrates one scenario in which a vehicle detects a congestion level that does not exceed a threshold, but detects a high level of signal interference, and therefore sets an interference mode to be "ON" (alternatively, sets an interference state to be "URGENT"). This indicates that interference is likely to be caused by an abnormal situation in which a few number of non-DCC sources are causing high levels of interference. As discussed previously, in this situation, the AMCO mechanism according to implementations disclosed herein will automatically switch to another channel, to avoid excessive delays and errors in communication caused by non-DCC interference sources.

Figure 11:
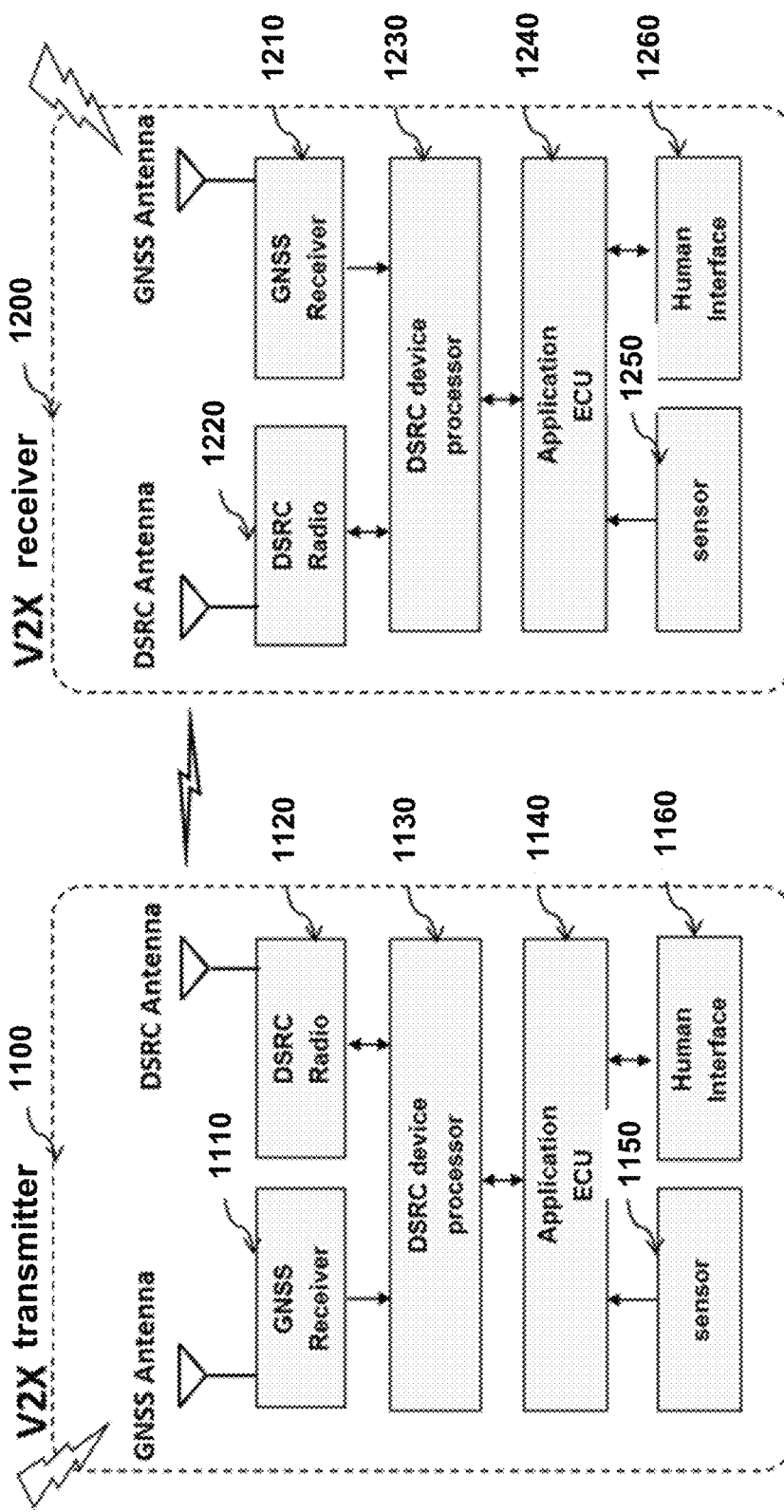
FIG. 11 illustrates an example of a system diagram for V2X communications, according to some implementations disclosed herein.

FIG. 11 illustrates an example of collecting interference information from other vehicles, according to some implementations disclosed herein. In this example, an interference monitoring vehicle collects interference information (e.g., CBR information) for AMCO from three other vehicles (vehicle-0, vehicle-1, vehicle-2) according to their respective channels that are being used. As shown in FIG. 11, the three other vehicles are utilizing one CCH and two SCHs. The monitoring vehicle is able to leverage interference information (CBR information) that was received from the three other vehicles to monitor interference levels of the different channels, without necessarily being required to perform separate interference monitoring for each of the different channels in each time slot. As such, different vehicles in a V2X communication system may share interference information (e.g., CBR values) collectively monitor interference levels in different channels in an efficient manner.

Figure 12:
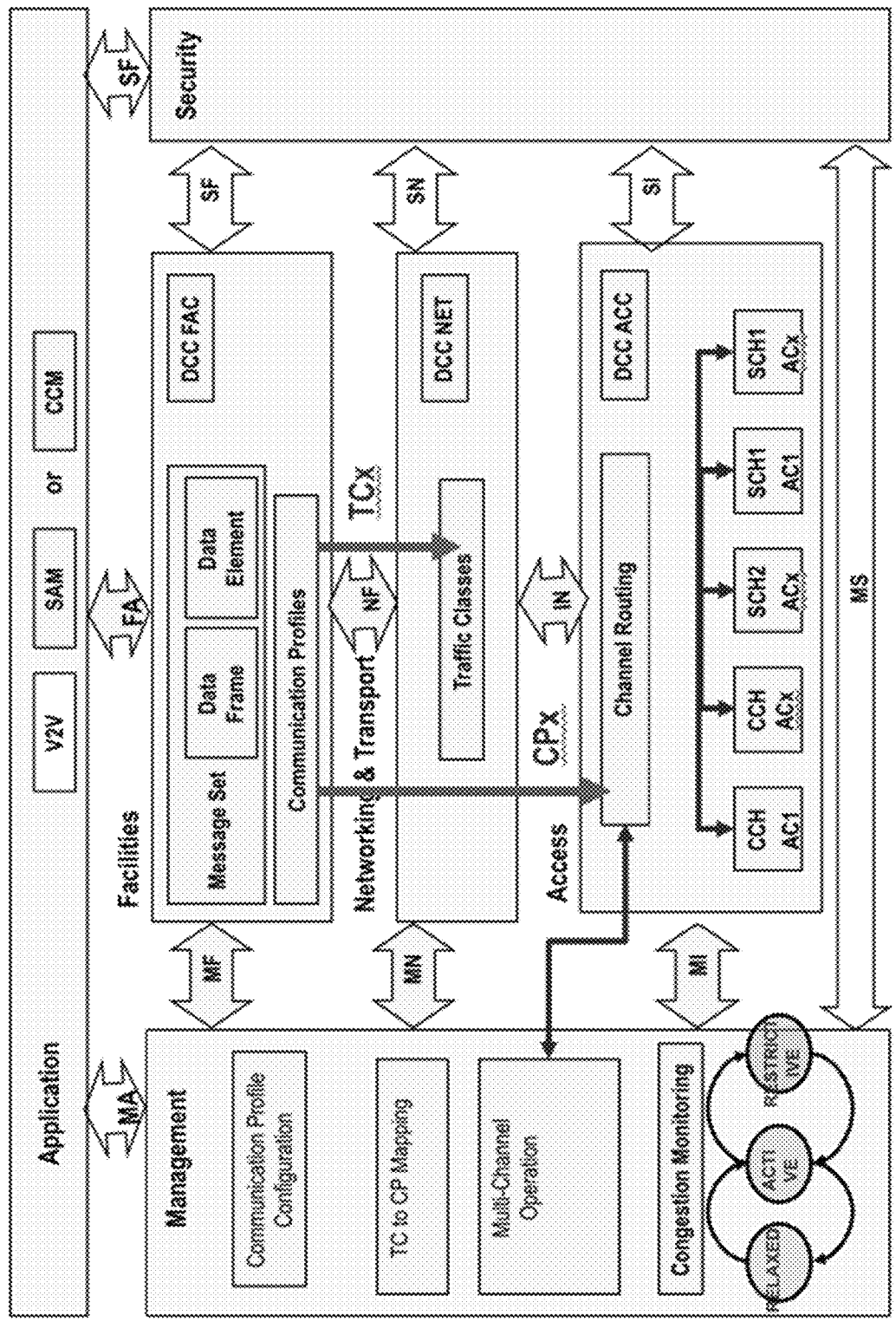
FIG. 12 illustrates an example of a protocol stack that implements AMCO according to some implementations disclosed herein.

FIG. 12 illustrates an example of a system diagram for V2X communications, according to some implementations disclosed herein. In this example, a V2X system implements DSRC technology, which is composed of a V2X transmitter and a V2X receiver. The V2X transmitter 1100 has a DSRC radio unit 1120 for wireless data transmission. This DSRC radio unit 1120 may implement the IEEE802.11p standard based on WLAN (Wireless Local Area Networks) and WAVE (Wireless Access in Vehicular Environments). The DSRC device processor unit 1130 encodes or decodes the WSM massage. The GNSS unit 1110 is configured to utilize a global navigation satellite system (GNSS) to acquire position information and time information. For example, a GPS (Global Positioning System) device may be used. The application ECU unit 1140 implements one or more processors that provide a specific application service. In order to provide a service, the application ECU unit 1140 generates an action based on sensor information and user input information, and transmits and receives messages through the DSRC/RSU device. The sensor unit 1150 is configured to collect vehicle status and surrounding sensor information. The human interface unit 1160 provides an interface for a user's input through an input button or touch screen, and a monitor for displaying information, such as a warning message.

The V2X receiver 1200 is configured to receive a signal sent from the V2X transmitter 1100. The V2X receiver 1200 may be mounted on an OBU of an automobile or may be mounted on an RSU, such as a traffic light, to receive a message from the V2X transmitter 1100. The receiver structure also includes a DSRC radio unit 1220, a GNSS receiver unit 1210, a DSRC device processor unit 1230, an application ECU unit 1240, a sensor unit 1250, and a human interface unit 1260. The DSRC radio unit 1220 and the DSRC device processor unit 1230 may implement a communication technology such as 3GPP, LTE and the like, as defined by North American and European standards, for example.

Figure 13:
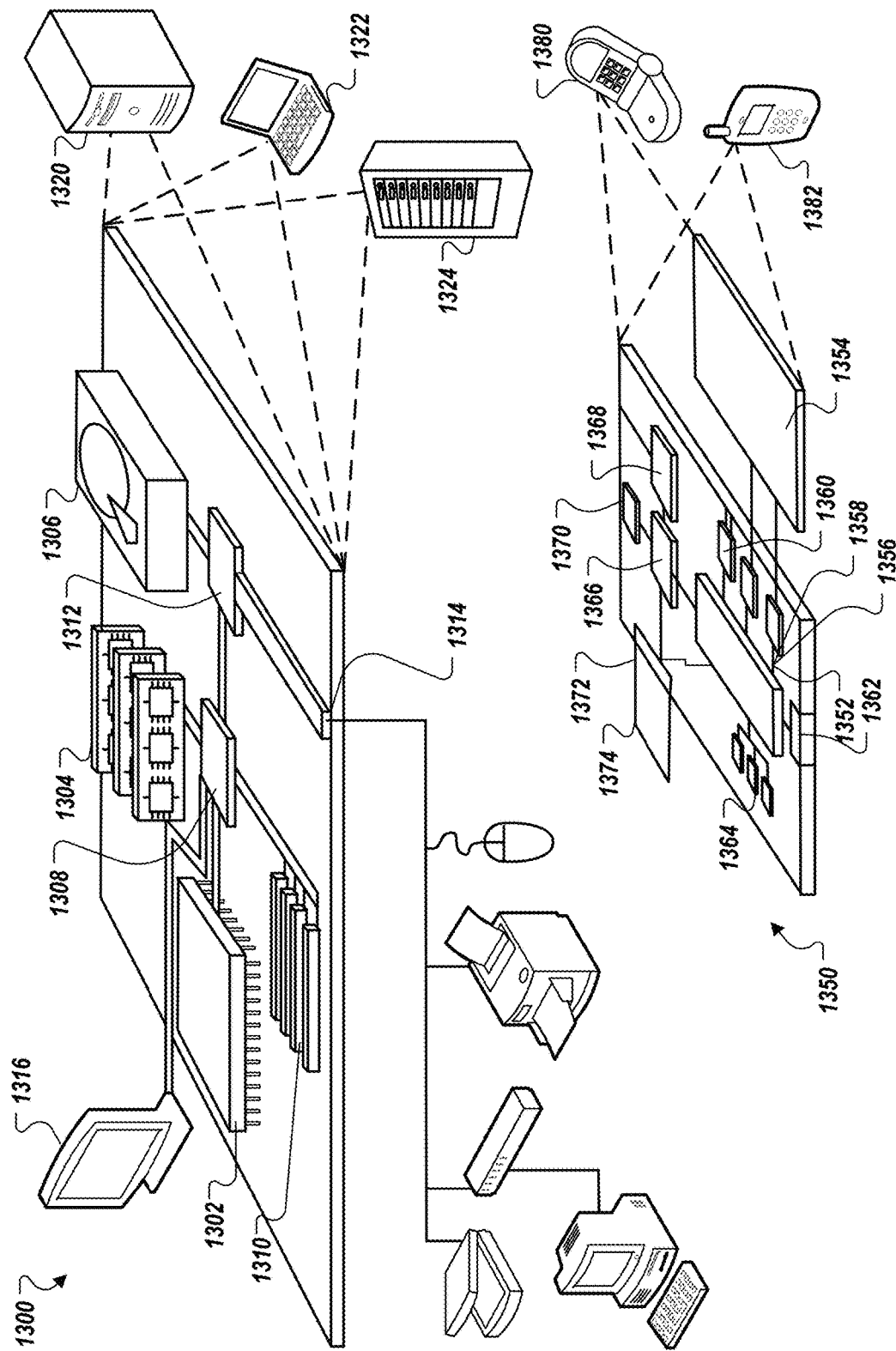
FIG. 13 is a diagram illustrating an example of a computing system that may be used to implement one or more components of a V2X communication system utilizing AMCO.

FIG. 13 illustrates an example of a protocol stack that implements AMCO according to some implementations disclosed herein. The protocol stack implements a number of protocols and corresponding standards.

For example, the Access layer may correspond to OSI layer 1 (physical layer) and OSI layer 2 (data link layer), and may use PHY technology and MAC technology implementing IEEE 802.11p, and may further support IEEE 1609.4 MAC technology to support communication in a vehicular environment. For example, the Access layer, as defined in IEEE 802.11p, may implement orthogonal frequency division multiplexing (OFDM), and various PHY layer transmission operations such as scrambling, FEC, interleaving, mapping, pilot insertion, IFFT, guard insertion and preamble insertion, PLCP sub-baseband signal processing, wave shaping (e.g., in-phase and quadrature-phase modulation), and digital to analog conversion (DAC).

The Networking & Transport layer may implement the IEEE802.2 standard for LLC Block and IEEE 1609.3 technology using the WAVE short message protocol (WSMP), and may correspond to OSI layer 3 (network layer) and OSI layer 4 (transport layer). In addition, the Networking & Transport layer may implement the IPv6/TCP protocol to process conventional IP signals.

The Facilities layer may implement the SAE J2735 standard message set, and may correspond to the OSI layer 5 (session layer) and OSI layer 6 (presentation layer). The message set implemented by the Facilities layer may include, for example, a BasicSafetyMessage (BSM) message, a MapData message, a SPAT message, a CommonSafetyRequest message, an EmergencyVehicleAlert message, an IntersectionCollision message, a ProbeVehicleData message, a RoadSideAlert message, and a PersonalSafetyMessage message. In particular, the Basic Safety Message (BSM) is used to transmit (e.g., periodically) various information about a vehicle, such as latitude, longitude, altitude, speed, direction, break, and vehicle size.

The Application layer may implement the J2945 standard for V2V, V2I, and V2O applications, and may implement, for example, emergency electronic brake lights (EEBL), forward crash warning (FCW), blind spot warning (BSW), lane change warning (LCW), intersection movement assist (IMA) loss warning.

In some implementations, as shown in the example of FIG. 12, DCC operation may be divided into layers according to the particular functions of each layer.

For example, the DCC_ACC entity may be included in the Access layer, and may control traffic congestion by adjusting various functions of the Access layer, such as power adjustment.

The DCC_NET entity may be included in the Networking & Transport layer, and may perform functions such as inserting interference information (e.g., local CBR information) into SHB packet headers for transmission to other vehicles, or receiving global CBR information from neighboring vehicles.

The DCC_FAC entity may be included in the Facilities layer and may control traffic congestion by adjusting various functions of the Facilities layer, such as message generation rate.

The DCC_CROSS entity may be included in the Management entity, and may perform overall DCC operations such as providing DCC parameters or CBR values to entities such as DCC_Access, DCC_NET, and DCC_FAC.

Various techniques may be utilized for controlling network load in DCC operation, examples of which are listed in the table below (and which were discussed previously).

| Technique | Description |
| --- | --- |
| TPC | In TPC, the output power is altered to adjust the current channel load. For example, during high utilization periods the ITS-S can reduce its output power and thereby, is a reduction in interference range achieved. This results in that ITS-Ss further away will experience a reduced CBR. |
| TRC | TRC regulates the time between two consecutive packets from an ITS-S. During high utilization periods, the TRC increases the time between two packets for the ITS-S, $T_{off}$ time. |
| TDC | TDC is a mechanism that can be used by wireless systems offering several transfer rate options. During high utilization periods and depending on application, a higher transfer rate can be used to decreased the $T_{on}$ time. |

In some implementations, DCC parameter evaluation includes global CBR information obtained from neighboring vehicles (e.g., from a neighbor table located in the Networking & Transport layer) and local CBR information (e.g., provided from the DCC_ACC entity of the Access layer) to generate interference information used in the AMCO. The generated interference information may be transmitted to different DCC entities in the Access layer, Networking and Transport layer, and Facilities layer, to be used for performing DCC functions belonging to the corresponding protocol layer.

In some implementations, the Access Layer may be configured to monitor various state indicators, such as: (i) the CBR in percentage values; (ii) SNR or Receiver Signal Strength Indicator (RSSI) statistics; (iii) Transmitter power reduction per message if a message cannot be transmitted; and (iv) Frames transmission indication regarding whether a message has been successfully transmitted or dropped.

The Access Layer provides the above information to the Management Entity via the MI-SAP message protocol.

The multi-channel operation (MCO) structure includes a channel coordination part in which channel access is defined, a channel routing part that defines overall data and frame management operations between the PHY-MACs, an Enhanced Dedicated Channel Access (EDCA) portion, and a data buffers (queues) portion for storing frames received from upper layers. A description of each part of the structure is as follows:

Channel coordination: channel access may be defined, for example, as CCH (control channel) and SCH (service channel).

Data buffers (queues): stores frames received from upper layers according to the defined AC (Access Category). Each data buffer may have its own AC.

Channel routing: transmits the data received from upper layers to the data buffer (queue), and performs transmission operations such as channel coordination, channel numbering for frame transmission, transmission power, and data rate control.

EDCA: guaranteeing quality of service (QoS) in the IEEE 802.11e MAC layer. This may be divided into four access categories (AC) according to the type of traffic. Different priorities may be assigned to each category, and differentiated parameters may be allocated for each AC. This may implement a competition-based medium access approach that allows more transmission opportunities for higher-priority traffic.

Implementations according to the present disclosure may implement various functionalities to implement AMCO. For example, a V2X transceiver may expand an existing WSMP message set, or develop a new message that informs a channel switching operation in the AMCO mechanism. In addition, the MCO and DCC control of the Management layer may be modified to implement enhanced congestion monitoring. Furthermore, the Access layer may be modified to implement AMCO.

According to some implementations disclosed herein, a new message referred to as a CCM (Channel Control Message) may be implemented, or an existing announcement message (e.g., WSM) may be extended to include channel reassignment information. In case of extending an existing message set, channel bandwidth information and the corresponding CBR information may be transmitted together. In the case of a new message (CCM), the message may be composed of ID information, location information, time information, guide information, information about whether a channel is divided into multiple channels, and information regarding channel bandwidth and CBR.

The ID information may include a msgId field indicating the information of the corresponding message, and the corresponding value may be in the form of DSRCmsgID data frame in the J2735 standard.

A stationPosition field and a stationType field may indicate location information. StationPosition, which indicates the location of the measuring station, may display the location of the measuring station using Position3D of the J2735 standard. The stationType field may indicate the type of the station, e.g., a value of '1' indicating the actual measurement station, and a value of '2' indicating an RSU that transmits predicted data.

In addition, the dataGenerationTime and msgGenerationTime, and updateTime fields indicate various time information for message. All of these fields may use the DTime field of the J2735 standard. The dataGenerationTime field represents the measurement time of CBR information in the system, the msgGenerationTime field represents the message generation time, and the updateTime field represents a time when the power for external interference is measured/updated.

In some implementations, the ChControlMessage (CCM) format may be implemented according to the example below.

TABLE 1

Example of ChControlMessage

```
ChControlMessage  ::=SEQUENCE{
    msgId DSRCmsgID              -- in J2735
    stationId       TemporaryID,  -- in J2735
    stationPositionPosition3D     -- in J2735
    stationType    StationType, OPTION
    dataGenerationTime DTime,     -- in J2735
    msgGenerationTime DTime,      -- in J2735
    updateTime    DTime,    OPTION,
    warningFlag   CLWarning OPTION,
    ChControlType    ChControl   OPTION
    CurrentCLData    CLData
    historyCLDataCLData     OPTION
    ...
}
```

According to some implementations of the present disclosure this, a monitoring mode may be specified in the CCM, using the ChControlType in the ChControlMessage. ChControl, which is a data frame defining ChControlType, is defined in Table 2 in this specification. ChControl is written using ASN.1, and SEQUENCE defines mode control for FullMonitoring mode, SavingMonitoring mode, and TriggerMonitoring mode.

FullMonitoring corresponds to monitoring the channel load (e.g., continuously) for all available radio bandwidths. SavingMonitoring refers to monitoring the channel automatically at fixed times according to a specified policy. ConditionalMonitoring defers to scanning all power levels of available channels and finding the most suitable channel when it is determined that the interference in a channel exceeds a threshold.

CurrentCLData and historyCLData refer to current and history channel load data, respectively. Current channel load data is transmitted and includes channel frequency range, bandwidth, and channel load information.

To do this, in some implementations, a data frame of ChControl may be utilized, as shown in Table 2, below. The above three monitoring modes may be supported, and each mode may be associated with a value of Mode and Lifetime.

TABLE 2

Data Frame Scheme for ChControl

```
ASN.1 Representation
    ChControl   ::=SEQUENCE {
        FullMonitoringMode ChControlMode
        SavingMonitoringMode      ChControlMode
        ConditionalMonitoringMode ChControlMode
        AutoStopLifetime    DTime
        RecirculationMode   ChControlMode
        RecirculationLifetimeDTime
        ...
    }
```

In FullMonitoring mode, some implementations utilize FullMonitoringMode and AutoStopLifetime to set the mode. AutoStopLifetime indicates the validity period of the mode control using DTime. AutoStop and Recirculation also have a Mode and Lifetime.

TABLE 3

Data Frame Scheme for ChControlMode

```
ASN.1 Representation
    ChControlMode   ::=ENUMERATED {
        Release      (0),
```

TABLE 3-continued

Data Frame Scheme for ChControlMode

```
        OnRecommend    (1),
        OnMandatory (2)
        ...
    }
```

ChControlMode is a data frame indicating the monitoring mode and may be set to ENUMERATED. If the value is '0', then it releases the monitoring mode. If it is '1', then the monitoring mode is set to 'On' with OnRecommend. However, if Auto mode is set, then the monitoring mode may be set automatically. In case of the value '2', OnMandatory is a mode which forces the monitoring mode to be 'On'.

FIG. 13 is a diagram illustrating an example of a computing system that may be used to implement one or more components of a V2X communication system utilizing AMCO.

The example system of FIG. 13 shows a computing device 1300 and a mobile computing device 1350 that can be used to implement the techniques described herein. For example, one or more parts of a communication unit (e.g., an OBU, RSU, or VRU in FIG. 1) could be an example of the device 1300 described here, such as V2X transmitter 1100 and V2X receiver 1200 in FIG. 12.

The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1302 is a single-threaded processor. In some implementations, the processor 1302 is a multi-threaded processor. In some implementations, the processor 1302 is a quantum computer.

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or may include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302).

The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementation, the low-speed interface 1312 is coupled to the storage device 1306 and the low-speed expansion port 1314. The low-speed expansion port 1314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may include one or more of the computing device 1300 and the mobile computing device 1350, and an entire system may be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1350, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry. The communication interface 1366 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1368 using a radio frequency. In addition, short-range communication may occur, such as using a Bluetooth, Wi-Fi, or other such transceiver (not shown). In addition, a GPS (Global Positioning System) receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1360, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method of transmitting, by a communication unit, channel allocation information for V2X (Vehicle-to-Everything) communications in a wireless communication system, the method comprising:
   determining a first channel, among a plurality of channels, that is utilized for V2X communications, the first channel defined by a first range of frequencies;
   determining state information that comprises first state information regarding signal interference in the first channel;
   determining whether the state information satisfies at least one criteria; and
   based on a determination that the state information satisfies the at least one criteria:
      determining a second channel, among the plurality of channels, through which to transmit channel-reassignment information, the second channel defined by a second range of frequencies;
      determining a third range of frequencies, different from the first and second ranges of frequencies, to which to re-assign the V2X communications of the first channel; and
      transmitting, by the communication unit through the second channel to at least one vehicle, the channel-reassignment information regarding a change in channel assignment for the V2X communications from the first channel to the third range of frequencies,
      wherein determining the third range of frequencies to which to re-assign the V2X communications of the first channel comprises:
         based on segmenting the first channel into at least two channel segments, determining a first channel segment, among the at least two channel segments, that defines the third range of frequencies to which to re-assign the V2X communications of the first channel,
            wherein the third range of frequencies is a subset of the first range of frequencies of the first channel.

2. The method of claim 1, wherein determining the third range of frequencies, different from the first and second ranges of frequencies, to which to re-assign the V2X communications of the first channel comprises:
   determining a third channel, among the plurality of channels, that defines the third range of frequencies to which to re-assign the V2X communications of the first channel,
   wherein the third range of frequencies is disjoint from the first range of frequencies of the first channel.

3. The method of claim 1, wherein determining the third range of frequencies, different from the first and second ranges of frequencies, to which to re-assign the V2X communications of the first channel comprises:
   determining the third range of frequencies as a result of merging the first range of frequencies and a fourth range of frequencies.

4. The method of claim 1, wherein determining the third range of frequencies, different from the first and second ranges of frequencies, to which to re-assign the V2X communications of the first channel comprises:
   monitoring, among the plurality of channels, a plurality of candidate channels and their respective signal-to-interference conditions; and
   determining, based on monitoring the plurality of candidate channels and their respective signal-to-interference conditions, a third channel having a signal-to-interference that is minimal among the plurality of candidate channels.

5. The method of claim 4, wherein monitoring the plurality of candidate channels and their respective signal-to-interference conditions comprises:
   performing any one of full monitoring, saving monitoring, and conditional monitoring for the plurality of candidate channels and their respective signal-to-interference conditions,
   wherein the full monitoring comprises monitoring channel loads for all available radio bandwidths,
   wherein the saving monitoring comprises performing channel monitoring automatically at fixed times according to a specified policy, and
   wherein the conditional monitoring comprises scanning power levels of all available channels and determining a most suitable channel, based on the signal interference in the first channel exceeding a threshold.

6. The method of claim 1, wherein determining the state information that comprises the first state information regarding signal interference in the first channel comprises:
   measuring a first ratio of time that the first channel is busy, as perceived by the communication unit; and
   determining a second ratio of time that the first channel is busy, as perceived by at least one vehicle other than the communication unit.

7. The method of claim 6, wherein measuring the first ratio of time that the first channel is busy, as perceived by the communication unit, comprises:
   measuring, at a transceiver of the communication unit, signal-to-interference in the first channel; and
   determining a first duration of time during which the signal-to-interference in the first channel measured at the transceiver of the communication unit exceeds a threshold.

8. The method of claim 6, wherein determining the second ratio of time that the first channel is busy, as perceived by the at least one vehicle other than the communication unit, comprises:
   receiving, by the communication unit, information regarding a second duration of time during which signal-to-interference in the first channel measured by the at least one vehicle other than the communication unit exceeds a threshold.

9. The method of claim 6, wherein determining the second ratio of time that the first channel is busy, as perceived by the at least one vehicle other than the communication unit, comprises:
   receiving, by the communication unit, information regarding the second ratio of time that the first channel is busy, as perceived by a first vehicle that is 1-hop away from the communication unit, or as perceived by a second vehicle that is 2-hops away from the communication unit.

10. The method of claim 1, wherein the state information further comprises second state information regarding congestion around the communication unit, the second state information related to a number of sources of interference in the first channel.

11. The method of claim 10, wherein the second state information regarding congestion around the communication unit comprises at least one of:
   (i) a number of messages that have been transmitted or received in the first channel by the communication unit or by at least one vehicle other than the communication unit, (ii) a number of neighboring vehicles around the communication unit, or (iii) sensing information that has been detected by the at least one vehicle other than the communication unit.

12. The method of claim 10, wherein determining that the state information satisfies the at least one criteria comprises:

determining, for the first state information, that the signal interference in the first channel exceeds a threshold interference criteria; and determining, for the second state information, that the congestion around the communication unit does not exceed a threshold congestion criteria.

13. The method of claim 1, wherein transmitting the channel-reassignment information by the communication unit through the second channel to the at least one vehicle comprises:

transmitting the channel-reassignment information, through the second channel, using an IEEE 802.11p-based communication protocol.

14. The method of claim 13, wherein the communication unit is configured to implement a Wireless Access in Vehicular Environments (WAVE) protocol, and wherein the channel reassignment information is configured as a WAVE Service Announcement (WSA) message.

15. The method of claim 14, wherein the channel reassignment information comprises channel bandwidth information and interference information.

16. The method of claim 1, wherein the second channel comprises a Control Channel (CCH) that has been assigned for the V2X communications.

17. The method of claim 16, wherein the second channel is channel number 178 that has been assigned for the V2X communications.

18. The method of claim 1, wherein the plurality of channels consists of seven channels, each having a bandwidth of 10 MHz, in a 5.9 GHz band of 5.855 GHz to 5.925 GHz.

19. A communication unit configured to transmit channel allocation information for V2X (Vehicle-to-Everything) communications in a wireless communication system, the communication unit comprising:

a transceiver;

at least one processor; and at least one computer memory that is operably connectable to the at least one processor and that has stored thereon instructions which, when executed, cause the at least one processor to perform operations comprising:

determining a first channel, among a plurality of channels, that is utilized for V2X communications, the first channel defined by a first range of frequencies;

determining state information that comprises first state information regarding signal interference in the first channel;

determining whether the state information satisfies at least one criteria; and based on a determination that the state information satisfies the at least one criteria:

determining a second channel, among the plurality of channels, through which to transmit channel-reassignment information, the second channel defined by a second range of frequencies;

determining a third range of frequencies, different from the first and second ranges of frequencies, to which to re-assign the V2X communications of the first channel; and transmitting, by the communication unit through the second channel to at least one vehicle, the channel-reassignment information regarding a change in channel assignment for the V2X communications from the first channel to the third range of frequencies, wherein determining the third range of frequencies to which to re-assign the V2X communications of the first channel comprises:

based on segmenting the first channel into at least two channel segments, determining a first channel segment, among the at least two channel segments, that defines the third range of frequencies to which to re-assign the V2X communications of the first channel, wherein the third range of frequencies is a subset of the first range of frequencies of the first channel.

20. At least one computer-readable storage medium encoded with at least one computer program comprising instructions that, when executed, cause at least one processor of a communication unit to perform operations of transmitting channel allocation information for V2X (Vehicle-to-Everything) communications in a wireless communication system, the operations comprising:

determining a first channel, among a plurality of channels, that is utilized for V2X communications, the first channel defined by a first range of frequencies;

determining state information that comprises first state information regarding signal interference in the first channel;

determining whether the state information satisfies at least one criteria; and based on a determination that the state information satisfies the at least one criteria:

determining a second channel, among the plurality of channels, through which to transmit channel-reassignment information, the second channel defined by a second range of frequencies;

determining a third range of frequencies, different from the first and second ranges of frequencies, to which to re-assign the V2X communications of the first channel; and transmitting, by the communication unit through the second channel to at least one vehicle, the channel-reassignment information regarding a change in channel assignment for the V2X communications from the first channel to the third range of frequencies, wherein determining the third range of frequencies to which to re-assign the V2X communications of the first channel comprises:

based on segmenting the first channel into at least two channel segments, determining a first channel segment, among the at least two channel segments, that defines the third range of frequencies to which to re-assign the V2X communications of the first channel, wherein the third range of frequencies is a subset of the first range of frequencies of the first channel.

* * * * *